(12) United States Patent
Tessier et al.

(10) Patent No.: US 7,403,111 B2
(45) Date of Patent: Jul. 22, 2008

(54) LOCATION SYSTEM USING A FIRST SIGNAL TO GATE A SECOND SIGNAL

(75) Inventors: Paul Tessier, Lynnfield, MA (US); Olin Lathrop, Groton, MA (US); Phil Gaudet, Concord, MA (US)

(73) Assignee: Radianse, Inc., Andover, MA (US)

( * ) Notice: Subject to any disclaimer, the term of this patent is extended or adjusted under 35 U.S.C. 154(b) by 82 days.

(21) Appl. No.: 10/970,070

(22) Filed: Oct. 20, 2004

(65) Prior Publication Data

US 2005/0140508 A1 Jun. 30, 2005

Related U.S. Application Data

(60) Provisional application No. 60/512,898, filed on Oct. 20, 2003.

(51) Int. Cl.
*G08B 1/08* (2006.01)

(52) U.S. Cl. ............................ 340/539.13; 340/825.49; 340/522

(58) Field of Classification Search ............ 340/539.13, 340/522, 825.49, 539.1, 539.11, 825.36, 340/686.1; 455/151.2, 39, 41.2, 500, 67.11
See application file for complete search history.

(56) References Cited

U.S. PATENT DOCUMENTS

| 5,268,734 | A | * | 12/1993 | Parker et al. | ............ | 356/139.06 |
|---|---|---|---|---|---|---|
| 5,873,040 | A | | 2/1999 | Dunn et al. | | |
| 5,917,425 | A | * | 6/1999 | Crimmins et al. | ...... | 340/825.49 |
| 6,574,482 | B1 | * | 6/2003 | Radomsky et al. | .......... | 455/517 |
| 6,894,612 | B2 | * | 5/2005 | Xydis | .................... | 340/539.11 |
| 6,912,379 | B2 | * | 6/2005 | Horng | ...................... | 455/226.4 |
| 2003/0190917 | A1 | | 10/2003 | De Cambray-Mathan | | |

* cited by examiner

*Primary Examiner*—Toan N Pham
(74) *Attorney, Agent, or Firm*—Lahive & Cockfield, LLP; Anthony A. Laurentano, Esq.

(57) ABSTRACT

A location system comprises a location determining module adapted to receive a first signal and a second signal. The location determining module is adapted to associate one of the signals with the other signal provided the first and second signals are received within a selected time period of each other.

41 Claims, 18 Drawing Sheets

LOCATION SYSTEM USING A FIRST SIGNAL TO GATE A SECOND SIGNAL

REFERENCE TO RELATED APPLICATIONS

The present invention claims priority to U.S. Provisional Patent Application Ser. No. 60/512,898, filed Oct. 20, 2003, entitled A Location System Using A First Signal to Gate A Second Signal, the contents of which are herein incorporated by reference.

TECHNICAL FIELD

The present invention relates to location system using two or more different types of signals, wherein a first signal is associated with a second signal, and more specifically the use of such a technique in the determining of a location of an object.

BACKGROUND

It is useful to know the location of people or objects for several reasons. The location in-and-of itself is important because it allows another party to find something that is lost, such as a child or a piece of expensive equipment. Location can also be valuable as a piece of data used in conjunction with other information. For example, knowledge about the location of a portable laptop computer combined with knowledge about the location of all the printers in a building allows a system to automatically route a print job from the laptop to the nearest printer, thus saving time and aggravation. The knowledge of who is in a particular room allows a system to adjust the temperature or lighting of that room to the individual's preferences or route that person's telephone calls to the phone in that room. These applications are presented here as examples illustrating the utility of systems that allows the location of a person or object to be known.

Existing systems suffer from several limitations. There is generally a direct tradeoff in these systems between precision and cost. If location needs to be known only to the resolution of a floor or a building, existing systems can be quite inexpensive. If however, location is needed down to the room level system costs are much higher, sometimes prohibitive. This is particularly true with systems that use RF and US techniques for location. For example, one such system from PinPoint costs about $6.84 per square foot of coverage to resolve location to a room. This is contrasted with IR-only systems, which are about half that cost at $3.89 per square foot (Based on Frost & Sullivan Report Number 5946-1: US Wireless Location/Tracking Markets, August 1999, pp 3-15 to 3-17.) Although IR systems are generally simpler and hence cheaper than RF or US systems, they have the fatal flaw of failing when the transmitters are obstructed. Therefore, the user is faced with either a very expensive system that is precise and reliable, or a less expensive system that fails to work some percentage of the time. Faced with these two options most users have decided to forgo the installation of location systems, despite the benefits such a system would provide.

Another limitation of systems that use IR signals is short battery life. Assuming that the location of a tagged object can be determined from one packet of data, the data contains 80 bits of information, is transmitted at a 1 KHz data rate, and enough current is passed through the LED to get a 20 to 30 foot range, one packet consumes approximately 135 mW of power. This means that for a reasonable size battery of 500 mAh capacity, and a transmission rate of once every 10 seconds, the user can expect a battery life of less than 58 days. RF transmissions are more power efficient (consuming about 50 times less power to send the same data) but have the undesirable characteristic of penetrating walls, which makes determining location based on them more difficult.

SUMMARY

Therefore, there is a need for a location system that has the relatively low cost and high accuracy of IR based systems while maintaining the long battery life and reliability of RF based systems.

The present invention provides a system and method for associating two different types of signals such as a RF signal and an IR signal. The association of the RF signal with the IR signal allows unique data regarding both signals to be provided in just the RF signal. Because the data for both signals can be transmitted in the more efficient RF signal, the IR signal does not need to contain unique data allowing for greater power savings.

In accordance with one aspect, a location system comprises a location determining module adapted to receive a first signal and a second signal, the location determining module being adapted to associate one of the signals with the other signal provided the first signal and second signal are received within a selected time period of each other. The association of signals allows one signal to provide information about both signals. Preferably, the signals are electromagnetic signals. In certain embodiments the first signal may be a RF signal and the second signal may be an IR signal. The first and second signals may be used to determine a location of an object.

In accordance with another aspect, a location system comprises one or more object identifiers adapted to transmit a first signal and a second signal and a location determining module adapted to receive the first signal and the second signal for determining a location of the one or more object identifiers from the first signal and the second signal, wherein the location detection module is adapted to associate the first signal with the second signal provided the signals are received within a selected time period of each other.

In accordance with another aspect, a method of signal association comprises the steps of: receiving a first signal and a second signal at a location determining module, and determining if there is an association between the first signal and the second signal based on whether the first signal and the second signal were received within a selected time period of each other. In certain embodiments the first and second signal are transmitted from an object identifier.

In accordance with another aspect, a location system, comprises an object identifier adapted to transmit a RF signal and a IR signal, and a location determining module adapted to receive the RF signal and the IR signal for determining a location of the object identifier from the RF signal and the IR signal, wherein the location detection module is adapted to associate the RF signal with the IR signal provided the signals are received within a selected time period of each other.

In accordance with another aspect, a method of signal association, comprises the steps of: transmitting a RF signal and a IR signal from an object identifier, receiving the RF signal and the IR signal at a location determining module, and determining if there is an association between the RF signal and the IR signal based on whether the RF signal and the IR signal were received within a selected time period of each other.

In accordance with another aspect, a method of determining location, comprises the steps of: transmitting a first signal and a second signal from an object identifier, receiving the first signal and the second signal at a location determining module, determining if there is an association between the first signal and the second signal based on whether the first signal and the second signal were received within a selected time period of each other, and determining a location of the object identifier based on receipt of the first signal and the second signal.

In accordance with another aspect, a method of determining location comprises the steps of: transmitting a RF signal and a IR signal from an object identifier, receiving the RF signal and the IR signal at a location determining module, determining if there is an association between the RF signal and the IR signal based on whether the RF signal and the IR signal were received within a selected time period of each other, and determining a location of the object identifier based on receipt of the RF signal and the IR signal.

BRIEF DESCRIPTION OF THE DRAWINGS

The invention will be apparent from the description herein and the accompanying drawings, in which like reference characters refer to the same parts throughout the different views.

DETAILED DESCRIPTION

Various embodiments of the present invention provide apparatus and methods for the determining of location information. Various embodiments of the invention allow for location information to be communicated over a network or over the Internet. Various embodiments of the invention may be configured to minimize installation efforts by the use of various techniques such as using wireless components to provide location information to fixed locations and by an ability in some embodiments of the invention to utilize existing wiring, already in place in many environments.

Figure 1A:
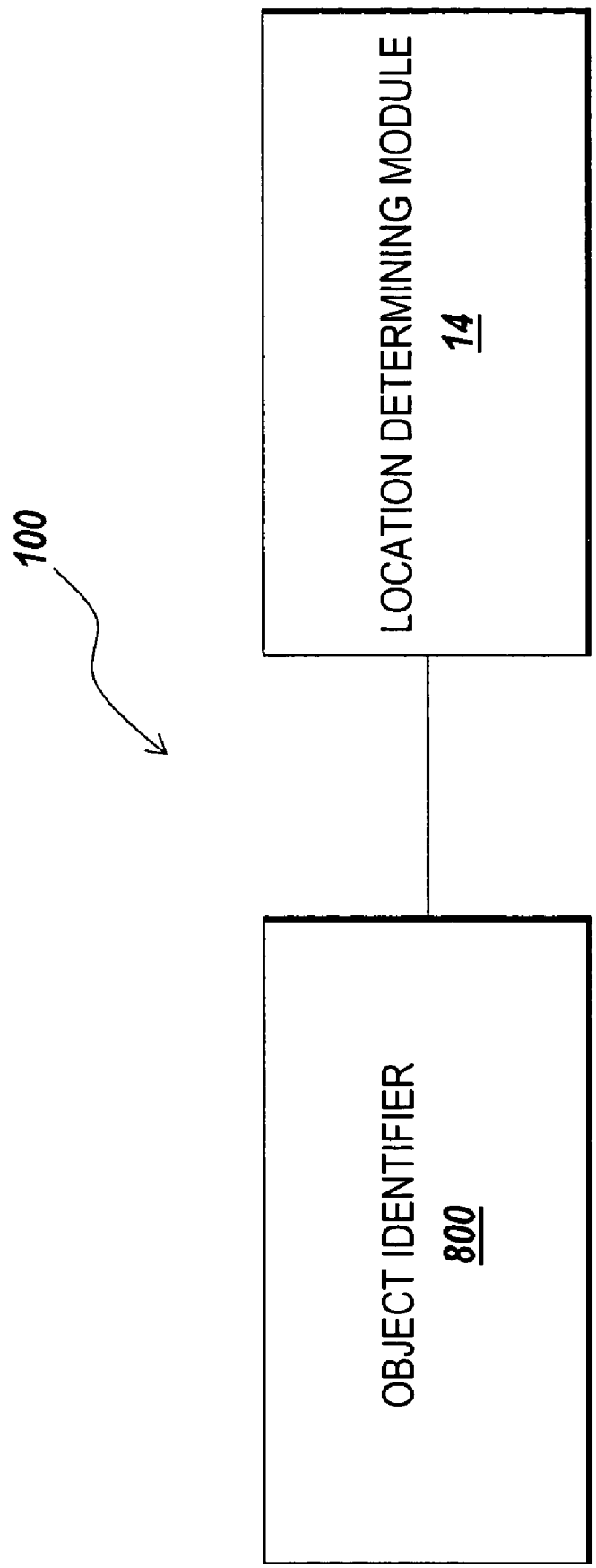
FIG. 1A illustrates a location system having an object identifier and a location determining module according to an embodiment of the invention.

A location system 10 is provided by way of example in FIG. 1A. The illustrated location system 10 includes an object identifier 800 and a location determining module 14. The object identifier 800 may be coupled to an object such that a location of that object corresponds to the location of the object identifier 800. The object identifier 800 may be any device capable of identifying a location of an object. According to an embodiment of the invention, an example includes an electronic device. Examples of electronic devices may be in many forms and include, by way of example, a processor, a computer, a personal digital assistant, a communications device, such as a cell phone, a network appliance, a web server, a network, any device capable of manipulating information, a receiver, a transmitter, an interface or any combination of these devices. A network may be a local area network (LAN), a wide area network (WAN), the Internet, an intranet, or a metropolitan network. The network may be a wireless network such as a Bluetooth network, a cellular network, a GSM based network, a hard-wired network, or some other type of network.

According to various embodiments of the invention, the object identifier 10 transmits two identifiers, one identifier corresponding to the object identifier 10 and a second identifier which is a group designator. While the identifiers may be in many forms, some examples, according to various embodiments of the invention, include numbers, letters, URLs, MAC addresses and IP addresses.

According to an embodiment of the invention, the location determining module 14 may include any structure suitable for determining location. Examples include any device with intelligence to determine the location of one or more object identifiers. According to various embodiments of the invention, the location determining module 14 may include one or more of each of the following, including combinations of the following: a network connection element, an object identifier, a fixed location identifier, a location resolver, a database, topology data, an electronic device, a web interface, a network interface, a specialized network interface, an implementation interface, a database interface, a network and/or a specialized network, a receiver and/or a transmitter. According to various embodiments of the invention, the location determining module 14 may have only a receiver, only a transmitter or both a receiver and a transmitter. It will be apparent to one of ordinary skill in the art that one or more components may be distributed in a wide variety of configurations.

According to various embodiments of the invention, the present invention may be used to determine a location of a location determining module. In such an embodiment, the location determining module may be a mobile module, capable of determining its own location relative to one or more object identifiers. In such an embodiment, the object identifiers may be fixed. Optionally, the object identifiers may be moving. One example of the use of a mobile location determining module involves a location system configured to determine locations within a large area. If such a large area is populated by a small number of objects, the components of such a location system may be more efficiently configured by providing functionality of a location determining module with each object. In such a case, object identifiers could be distributed throughout the large area. The location determining module could then be adapted to receive location signals from the object identifiers and thereby determine a location of the location determining module. In this embodiment, the location of the objects is determined relative to the location of the one or more object identifiers, although the locations of the object identifiers may be known, allowing locations of objects to be determined relative to other references or by name, such as a location on a map or a specific room.

The configuration above is contrasted with another embodiment of the invention, better suited to environments with a greater number of objects in a smaller area. In such an embodiment, each object may be provided with an object identifier. One or more location determining modules may then be located within the area to receive location signals transmitted by the object identifiers. In this embodiment, the location of the objects is determined by determining the location of the object identifiers.

According to various embodiments of the invention, the location determining module 14 may be capable of performing additional functionality, such as receiving requests for information, providing information, storing information, commanding actions in response to location information, associating objects with other objects or with locations, establishing privacy conditions regarding availability of location information, interfacing directly with various network types, and the like. According to further embodiments of the invention, the location determining module 14 includes multiple, distributed receivers, some of which may be connected to a network, and others not connected to a network. According to various embodiments of the invention, the object identifier 10 and location determining module 14 utilize both RF signals and IR signals for the determination of location.

According to an embodiment of the invention, the location determining module 14 may include one or more databases. The databases may store information relating to current location of object identifiers, fixed location identifiers and network connection elements.

According to various embodiments of the invention, the invention may be used only within an enclosed structure. Enclosed structures include buildings, such as office buildings, exhibition halls, health care institutions, homes or other structures. According to other embodiments, the invention may be used outside of enclosed structures or may be used both within and outside enclosed structures.

Figure 1B:
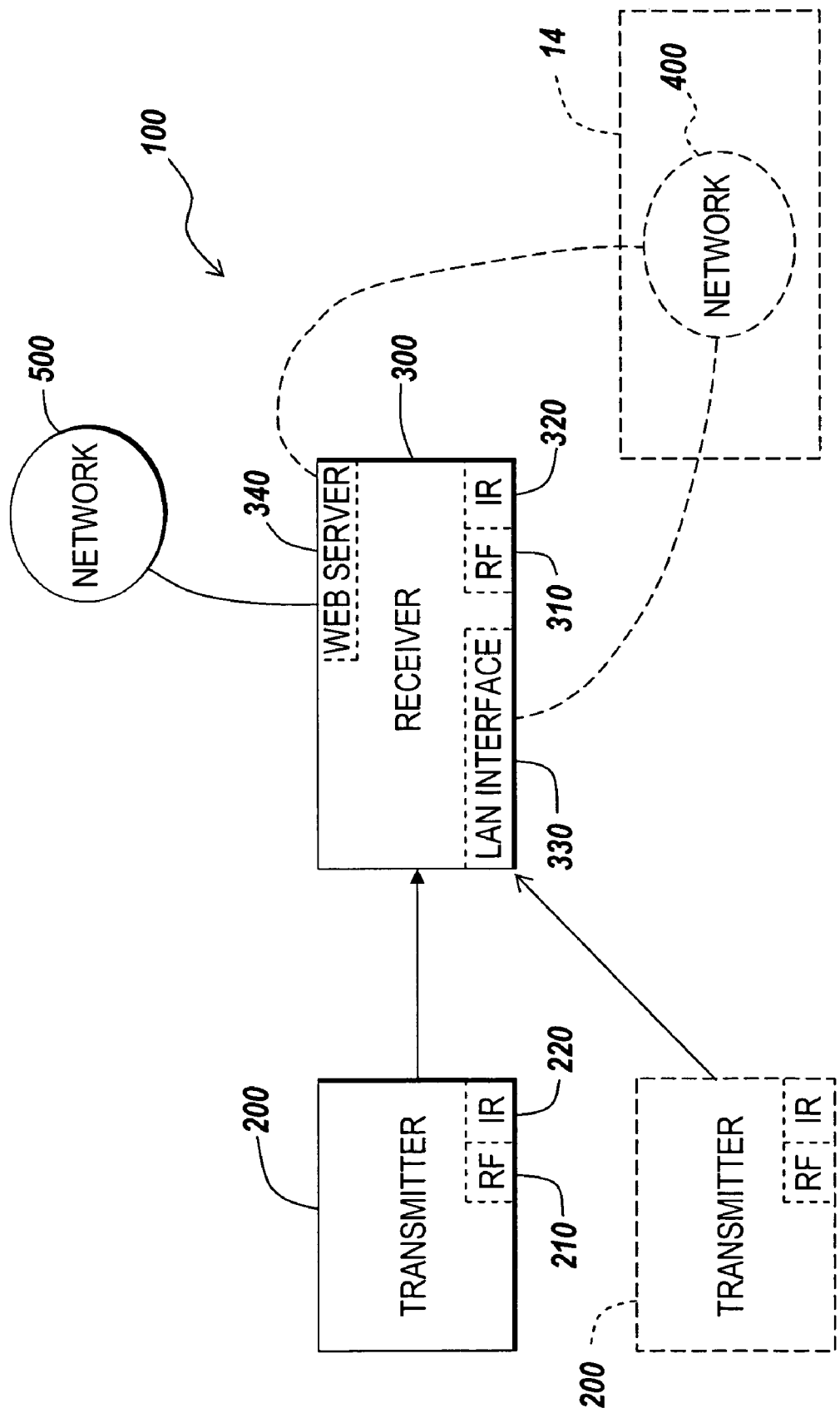
FIG. 1B illustrates a location system having a receiver and one or more transmitters according to an embodiment of the invention.

According to an embodiment of the invention, a location system 100 is provided. As illustrated by way of example in FIG. 1B, the location system 100 is provided with a transmitter 200 and a receiver 300. Optionally, additional transmitters 200 (shown in phantom) may be provided. The transmitter 200, for example, can form part of the object identifier 800, and the receiver 300, for example, can form part of the location determining module 14. A transmitter 200 communicates with the receiver 300 in order to provide a signal for receipt by the receiver 300. According to one embodiment of the invention, the transmitter 200 transmits a signal using only a radio frequency (RF) transmitter 210. In such an embodiment, the receiver 300 is provided with an RF receiver 310. According to a further embodiment of the invention, the transmitter 200 may be provided only with an infra red (IR) transmitter 220 to transmit an IR signal. In such an embodiment the receiver 300 is provided with an IR receiver 320. According to a further embodiment of the invention the transmitter 200 is provided with both an RF transmitter 210 and an IR transmitter 220 while the receiver 300 is correspondingly provided with both an RF receiver 310 and an IR receiver 320. According to this embodiment, both the RF signal and the IR signal are used for the determination of the location of the transmitter 200. According to one practice, the RF signal can include information unique to the object identifier or the object to which it is attached. The IR signal can be non-unique and not include any specific information.

According to a further embodiment of the invention, the receiver 300 may be provided with a network interface 330. An example of the network interface 330 includes an interface for a local area network (LAN) or another interface to allow direct coupling of the receiver 300 to a network 400. According to one embodiment of the invention the network interface 330 is comprised of an interface capable of direct coupling of the receiver to a UTP-based, Ethernet network interface. The Ethernet network may be a wired or wireless network or a combination thereof.

According to another embodiment of the invention the receiver 300 is provided with a web server 340. The web server 340 may be configured to provide location information directly to the network 400 and/or the Internet 500. The web server 340 may also be configured to allow for control or configuration of the receiver 300 through the network 400 and/or the Internet 500.

According to one practice, the receiver 300 can be configured to convey signals to the network 400 in a periodic or intermittent manner. By way of example, the receiver 300 can convey information in any appropriate format, such as a data packet, to the network 300 every selected time period. The time period can preferably be between 1 second and 10 minutes, more preferably between 5 seconds and 1 minute, and most preferably every 10 seconds. The signals generated by the receiver are independent of receipt of signals from an object identifier. That is, the generation of signals by the receiver is periodic and not in response to receipt of a signal by the receiver.

As shown by way of example, a location determining module 14, according to an embodiment of the invention, is illustrated, by way of example, as including the network 400.

Figure 2:
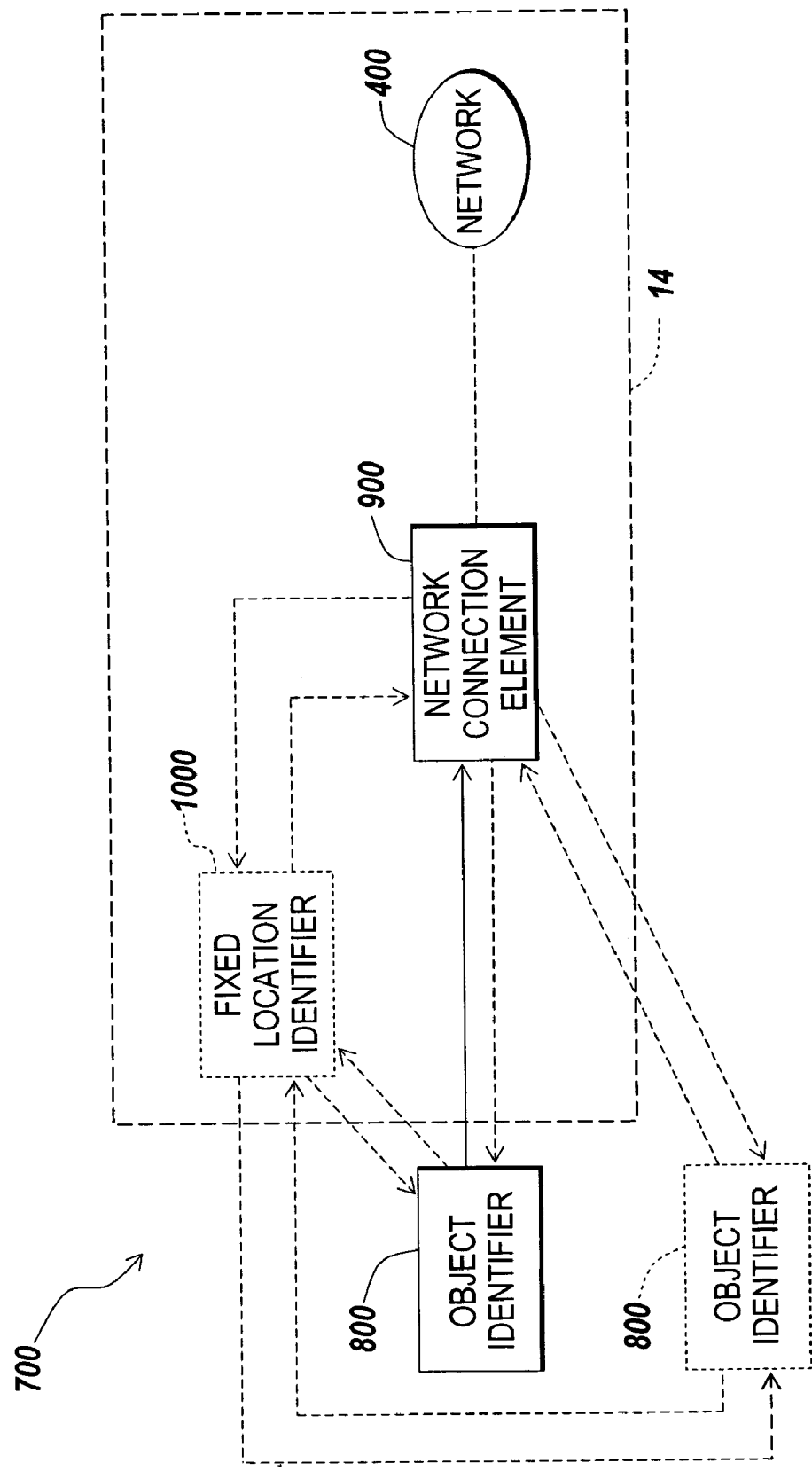
FIG. 2 illustrates a location system according to another embodiment of the invention having a network connection element, one or more object identifiers and an optional fixed location identifier.

A further embodiment of the invention is illustrated in FIG. 2. A location system 700 is illustrated by way of example having an object identifier 800 in communication with a network connection element 900. According to an embodiment of the invention, the object identifier 800 is physically coupled to an object so that the location of the object identifier 800 is considered to be the location of the object. According to another embodiment of the invention, the location of the object may be determined by locating one or more object identifiers 800 in an area and coupling a network connection element 900 to an object. In such an embodiment, the location of the network connection element 900, and hence the object, is determined relative to the one or more object identifiers 800. The network connection element 900 is configured to be coupled to a network 400. According to an optional embodiment of the invention, the network may be a wireless network. As illustrated in FIG. 2, one or more object identifiers 800 communicate to the network connection element 900. According to another embodiment of the invention, the network connection element 900 may communicate back to the object identifier 800.

According to a further embodiment of the invention a fixed location identifier 1000 can optionally be provided. The fixed location identifier 1000 is configured to receive signals from one or more object identifiers 800 and retransmit that information. The retransmitted information may be received by the network connection element 900. According to one embodiment of the invention the retransmitted information includes the information provided by the object identifier 800, coupled with additional information to identify the fixed location identifier 1000 that is re-transmitting the information. According to an embodiment of the invention, plurality of network connection elements 900, fixed location identifiers 1000 and object identifiers 800 may be provided in the location system 700. In such a case, the network 400 may provide communication among the network connection elements 900 in order to determine the location of one or more object identifiers 800 by one or more network connection elements 900 or by the use of other devices coupled to the network 400.

As shown by way of example, a location determining module 14, according to an embodiment of the invention, is illustrated, by way of example, as including the network connection element 900, the fixed location identifier 1000 and the network 400.

According to an embodiment of the invention, the object identifier 800 and/or fixed location identifier 1000 transmits various information. According to an embodiment of the invention, this information is transmitted over both RF and IR signals. Optionally, the information may be transmitted over only one signal. According to an embodiment of the invention, examples of the information transmitted may include one or all of the following: RF power level; R power level; battery level; input device status; transmission frequency, e.g. repetition rate, for any or all types of transmissions, such as IR and/or RF; an identifier corresponding to the transmitting device; an identifier corresponding to a group to which the transmitting device is associated; any information received from another system component; status or condition information; or the like. According to an embodiment of the invention, some information may be repeated over multiple signal transmissions. Examples include transmitting input device status over ten transmissions to increase the likelihood of receipt by other components of the location system.

Figure 3:
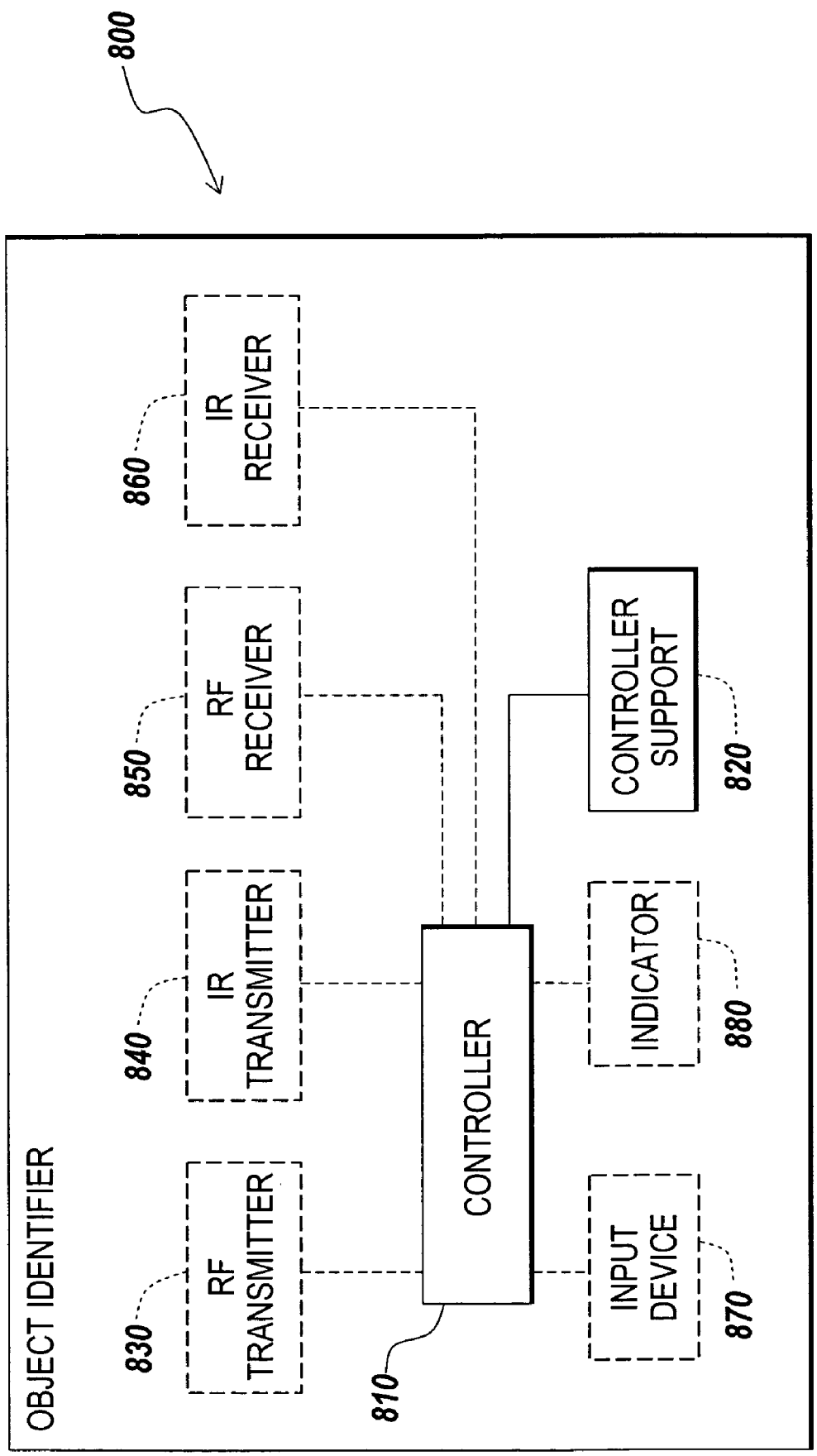
FIG. 3 illustrates an object identifier according to an embodiment of the invention.

The object identifier 800 according to an embodiment of the invention is illustrated by way of example in FIG. 3. The object identifier 800 is provided with a controller 810 and controller support 820. The controller support 820 may include various items such as a power supply, such as a battery or other apparatus to provide electrical power, memory and/or various time keeping circuitry such as an oscillator. Controller support 820 may optionally include non-volatile memory. Various components of the controller support 820 may optionally be incorporated into the controller 810 or may be provided from an external source, outside the object identifier 800.

According to an embodiment of the invention, the object identifier 800 may be provided with an RF transmitter 830. According to a further embodiment of the invention the object identifier 800 may be provided with an IR transmitter 840. According to an further embodiment of the invention the object identifier 800 is provided with both an RF transmitter 830 and an IR transmitter 840.

According to another embodiment of the invention, the object identifier 800 is provided with an RF receiver 850. According to another embodiment of the invention the object identifier may be provided with an IR receiver 860.

The object identifier 800 may also be provided with an input device 870. Examples of input devices include buttons, switches, keypads, ports for electrical or optical communication with other devices, sensors, such as photo cells cameras or microphones. Other types of input devices 870 may be apparent to one of ordinary skill in the art upon reading this disclosure and are to be considered within the scope of the invention. One or more input devices 870 are configured to provide input to the controller 810 in order to allow the controller 810 to take an action, not take an action, or to forward information outside the object identifier 800 by way of an RF transmitter 830 and/or an IR transmitter 840.

According to a further embodiment of the invention an indicator 880 may be provided to enable the controller 810 to output information in the proximity of the object identifier 800. Examples of indicators 880 include visual, audio and vibrational devices. Examples of these include buzzers, bells, horns, LEDs, other forms of lights and/or displays. The indicator 880 may be configured to display or output information determined by the controller 810 or received by the controller 810 through the input device 870, RF receiver 850 and/or the IR receiver 860.

Figure 4:
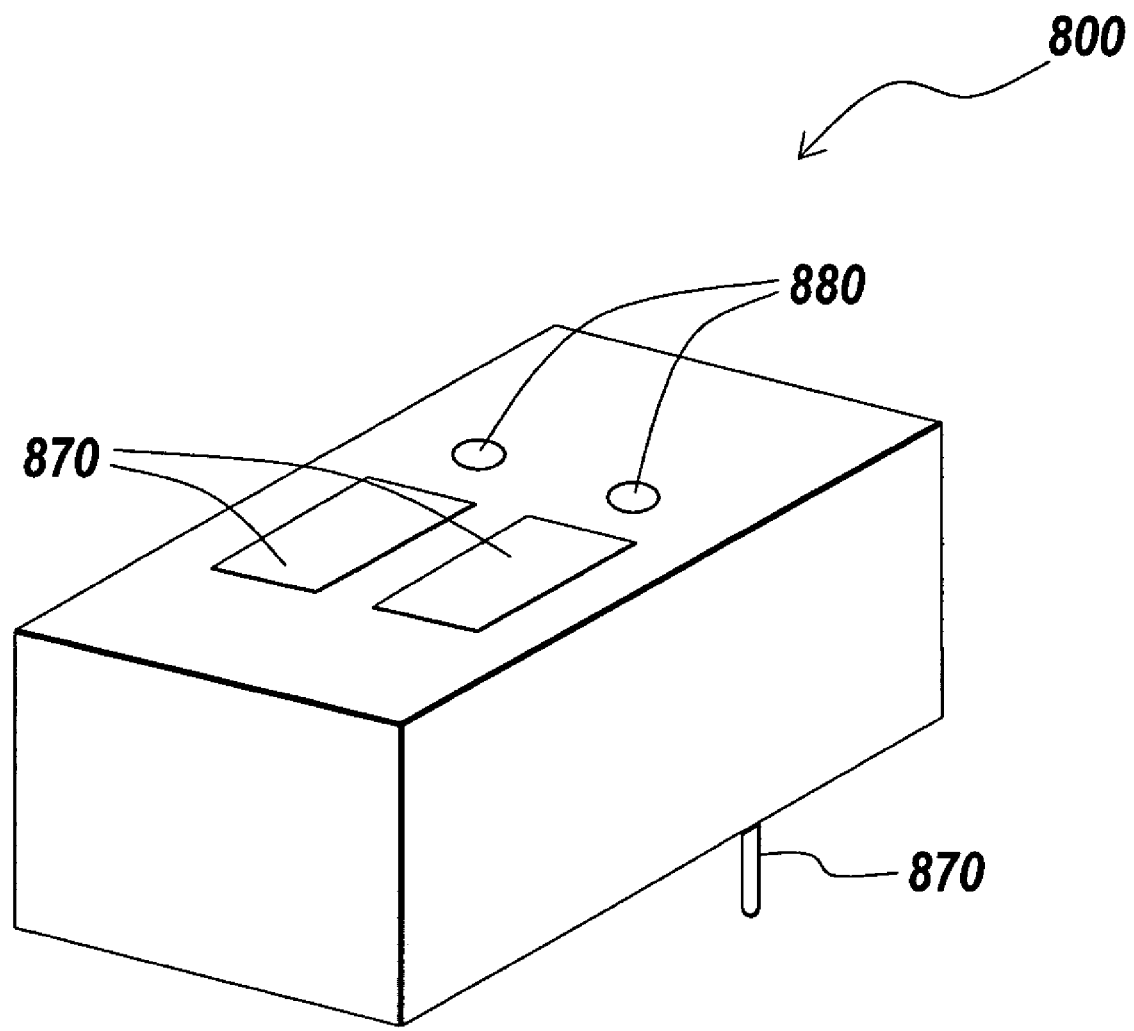
FIG. 4 is a perspective view of an object identifier according to an embodiment of the invention.

An object identifier 800 is illustrated by way of example according an embodiment of the invention, in FIG. 4. The object identifier 800 is illustrated with two indicators 880 in the form of two LEDs. Three input devices 870 are also illustrated in the form of switches. Two switches are illustrated so as to correspond to the two indicators 880, while the third switch 870 is illustrated on an opposing surface of the object identifier 800. According to this illustrative embodiment, the input device 870 on the lower surface of the object identifier 800 is normally pushed in when the object identifier 800 is attached to an object. Upon removal from the object, the input device 870 extends, resulting in a change of position of the input device 870. This embodiment allows the controller 810 to be alerted when the object identifier 800 is removed from an object. Each of the indicators 880 may be configured to illuminate upon the activation of the corresponding switches, input devices 870, so as to allow visual confirmation of the activation of one of the switches. Various uses of these switches will become apparent to one of ordinary skill in the art. Several examples, by way of illustration, include panic alerts, causing the processor 810 to emit a specialized signal through at least one of the RF transmitter 830 and the IR transmitter 840. A further example may involve an ability to configure a portion of the location system 700 remotely by the activation of the input devices 870.

Figure 5A:
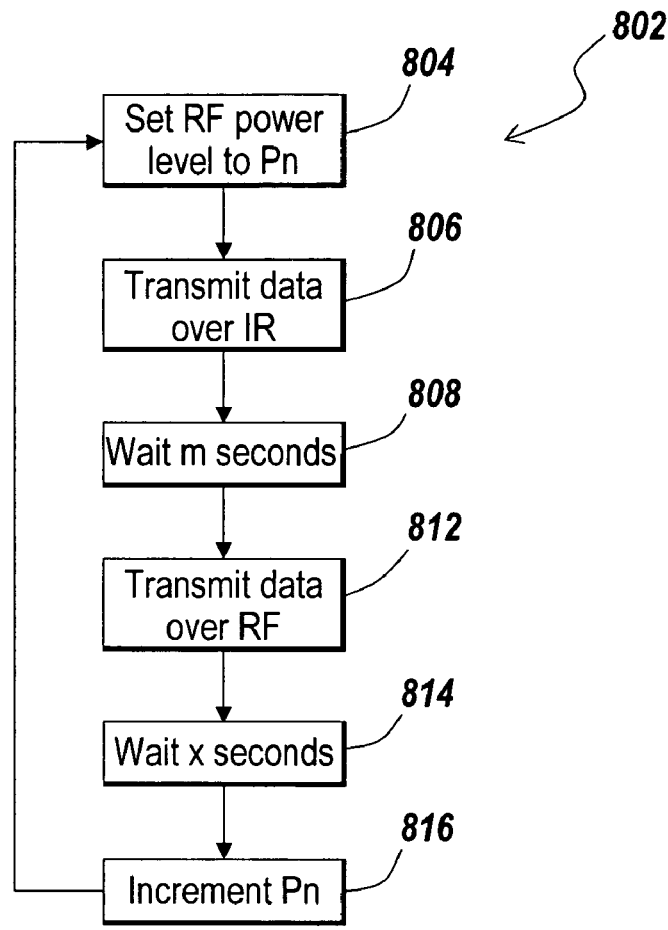
FIGS. 5A-5C illustrate the association of a first and second signal.
Figure 5B:
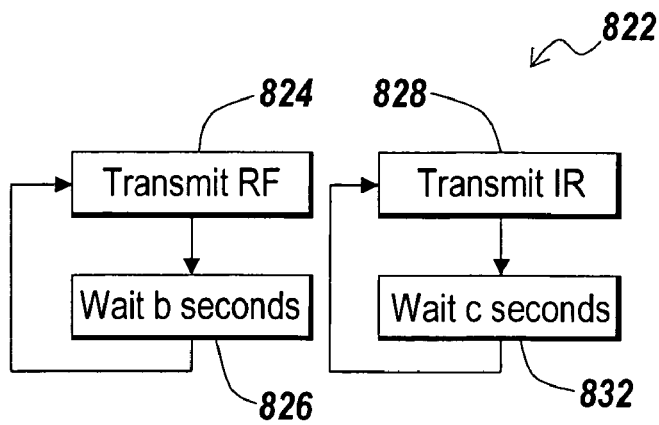
Figure 5C:
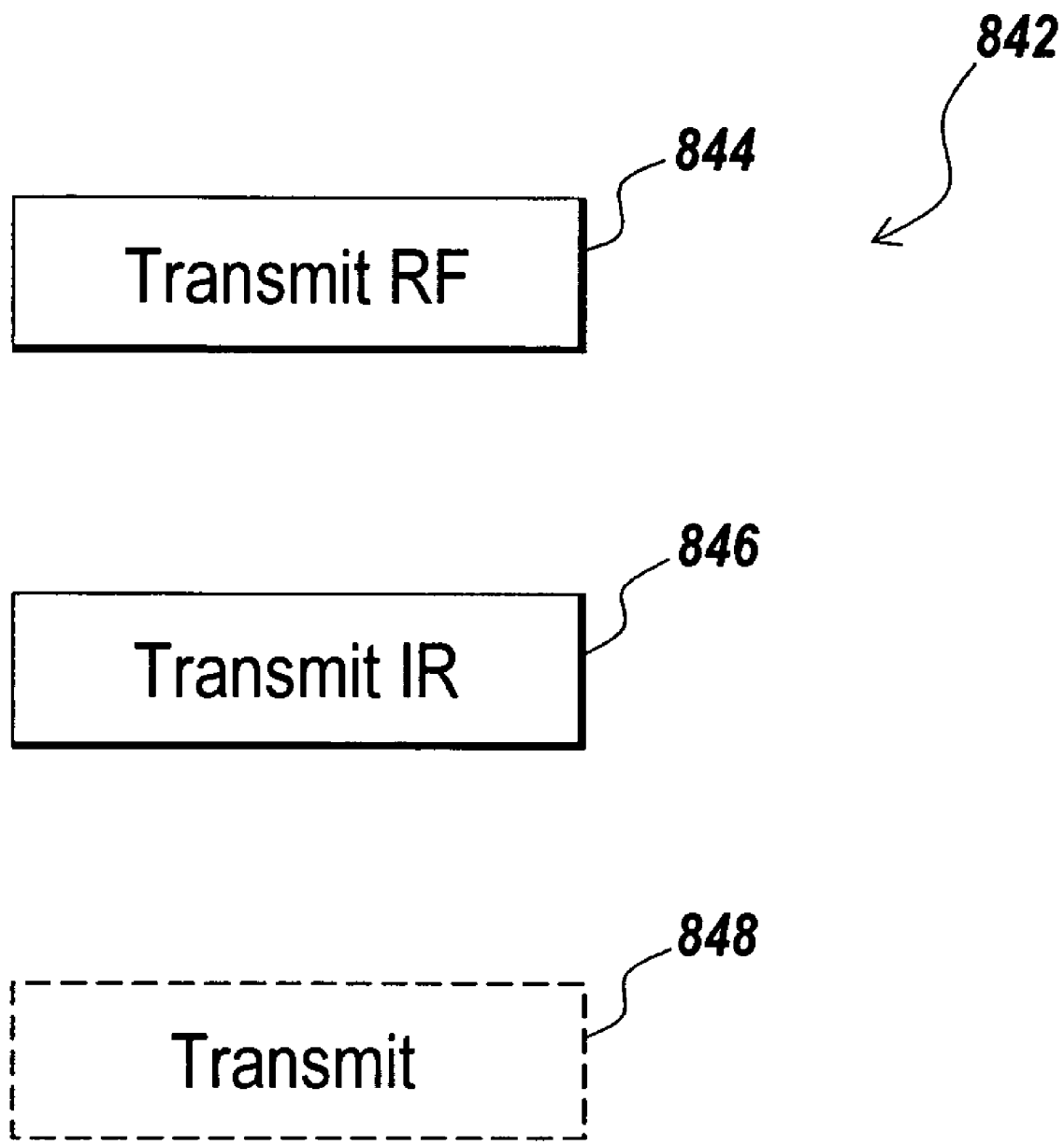

FIGS. 5A, 5B and 5C illustrate, according to various embodiments of the invention, various examples of a transmission of signals from the object identifier 800. A first method 802 is illustrated in FIG. 5A according to an embodiment of the invention. An RF power level is set to Pn, step 804. An IR signal is transmitted, step 806. The delay of m seconds then occurs, step 808. An RF signal is transmitted, step 812. A further delay of x seconds occurs, step 814. PN is then incremented, step 816. This method 802 provides a substantially consistent IR power level, while varying an RF power level. Varying the RF power level may assist in determining a location of the object identifier 800 by enabling the network connection element 900, location determining module 14, or receiver 300 to receive less than all of the RF signals. According to an embodiment of the invention, one or both of the IR and RF signals are also transmitting information. Examples of this information may include the signal strength being transmitted, the period between transmissions, the length of time of the transmissions, various identifiers, corresponding to the object identifier 800, information received from one or more input devices 870 and/or various status information, such as those pertaining to the controller 810 controller sport 820 or other components of the object identifier 800.

Determination of the frequency and length of the transmissions involves considerations including battery life precision of location, frequency of updates to location, interference among signal transmissions and network traffic.

A further method 822 of an embodiment of the invention is illustrated in FIG. 5B. According to this embodiment, an RF signal is transmitted, step 824 and a delay, step 826 occurs before the next transmission of an RF signal, step 824. Independently of the RF transmission, an IR signal is transmitted, step 828. The IR transmission, step 828 may occur simultaneously with the transmission of the RF signal, step 824 but this embodiment of the invention is not so limited. The transmission of the RF signal, step 828 may occur at any time relative to the transmission of the RF signal step 824. A delay of c seconds step 832, occurs before the next transmission of the RF signal, 828.

According to a further embodiment of the invention, a further method 842 is illustrated by way of example in FIG. 5C. According to this embodiment, an RF signal is transmitted, step 844 and an IR signal is transmitted, step 846. According to an alternative embodiment, a transmission in another medium may also occur, step 848. Examples of other mediums include ultra-sonic (US), visual light, or audible sound. According to the method 842 of FIG. 5C, transmissions may be continuous, variable or occur at regular intervals. The transmissions among various mediums may be synchronized or random relative to transmissions in other mediums.

According to another embodiment, the association of two or more signals in different mediums allows for the ability to use one type of signal, in association with another signal, to provide information about both signals. In other words, the first signal can provide information for both the first and the second signal. For example, a first signal, such as an RF signal, and a second signal, such as an IR signal, could be transmitted. In this example, by associating the IR signal with the RF signal allows the RF signal to transmit data pertinent to both the RF signal and the IR signal.

IR transmissions are line-of-site and therefore desirable to help determine location (since the IR signal can't penetrate walls). However, the IR transmission consumes a great deal of energy when it is illuminated, so the battery life of an object identifier using IR transmissions is greatly reduced. Since RF transmissions are many time more efficient than IR transmissions, it is beneficial to send data using RF rather than IR. Thus, associating an IR signal with an RF signal allows the transmission of data via RF, rather than sending data independently via IR. The RF signal, containing data, is used to identify or authenticate the IR signal, which does not carry data. In this manner, the first signal may provide information about the second signal. For example, the above disclosed RF signal may contain information about or regarding the IR signal.

Figure 5D:
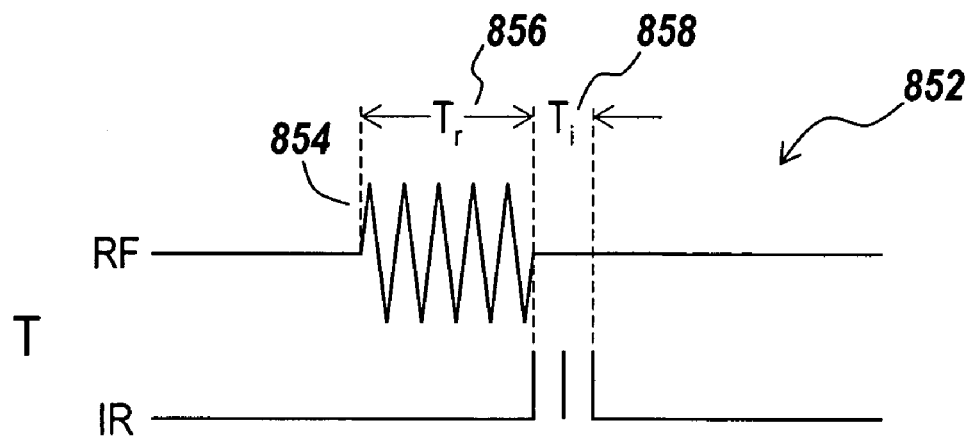
FIGS. 5D-5I illustrate the operation of a signal association method using two or more signals.

In operation, data is sent from an object identifier via RF. Immediately following a RF transmission, a short IR pulse pattern is sent—this pulse pattern requires much less energy than sending a data packet via IR. An illustrative example of such a transmission sequence 852 is illustrated in FIG. 5D. A theoretical RF transmission 854 is immediately followed by a theoretical IR transmission 856. When a location determining module, receiver, fixed location identifier, or network connection element receives a valid RF signal, it determines if a valid IR signal was received immediately following the RF signal. The IR signal can then be associated with the RF signal which identifies the origin of the IR signal. The system can then determine that the object identifier that sent the RF signal is within line of sight of the location determining module. This information is then used to assist in determining the location of the object identifier.

Figure 5E:
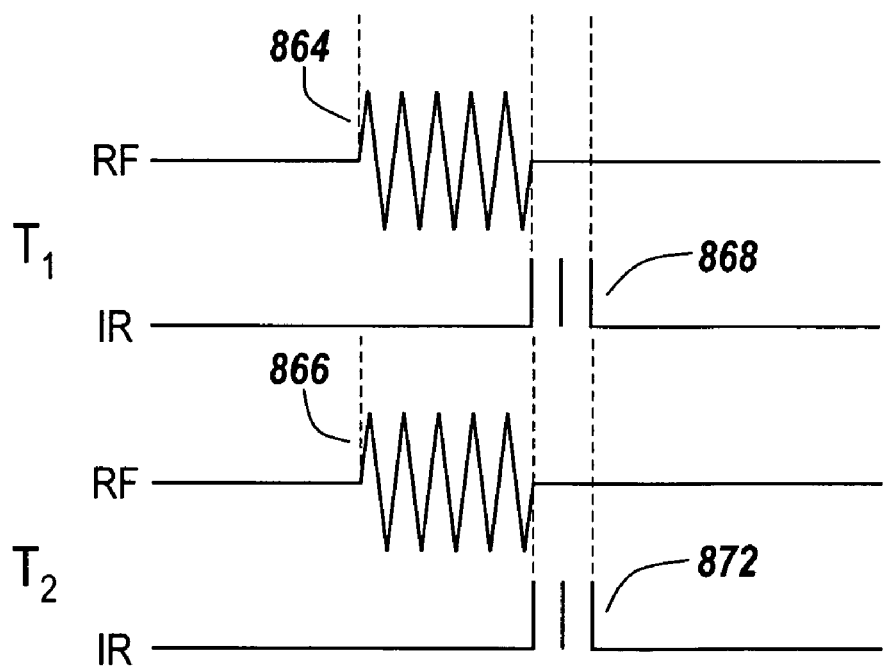

The IR signal transmitted by an object identifier does not need to contain any unique identifying information provided the duration of the IR signal is less than the duration of a RF signal. Even though the IR signal is not unique to an object identifier, the scheme works even with multiple object identifiers transmitting signals to the same location determining module. Since, in the example embodiment, the object identifiers are asynchronously transmitting RF signals having signal durations or time intervals $(T_r)$ 856 longer than the duration of the IR signal $(T_i)$ 858, the signals are typically received at different times at the location determining module. It is understood that the invention is not limited to this timing interval or sequence. On occasion, as illustrated in FIG. 5E, RF signals 864 and 866, and IR pulse patterns 868 and 872 will overlap. When this situation occurs the RF signal may be corrupted and the signal may be ignored or dropped by the system 10. This situation occurs infrequently and is determined by the duration of the RF signal $(T_r)$, transmission interval and the number of object identifiers within range of a location determining module and is independent of the IR scheme. Since the object identifiers repeatedly send signals, location will be picked up on a subsequent transmission.

Figure 5F:
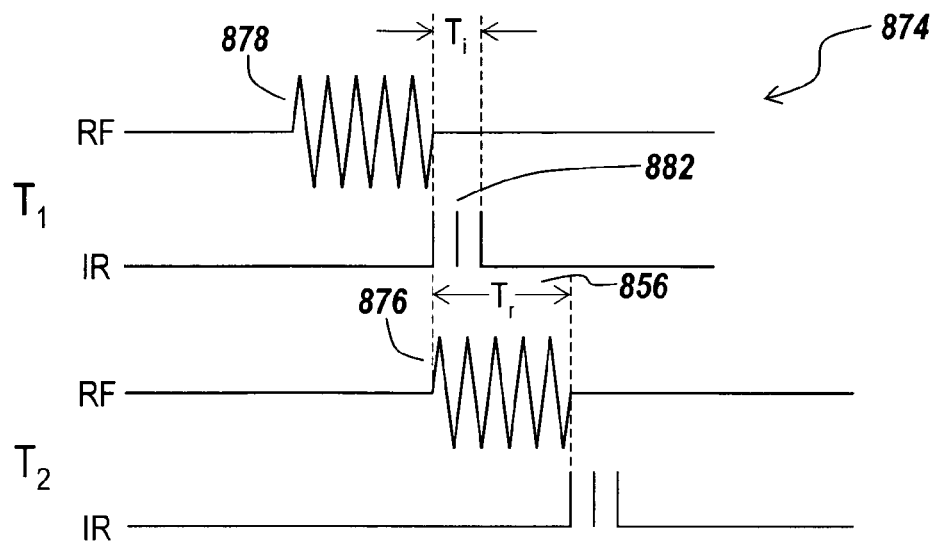

FIG. 5F illustrates a scenario 874 whereby one RF signal 876 follows another RF signal 878. As long as the duration $(T_i)$ 858 of the IR signal is shorter than the duration $(T_r)$ 856 of RF signal 876, the IR signal 882 will be received prior to the completion of the next RF packet 876 and the system accurately associates with the IR signal 882 with the RF signal 878. Likewise, the system will associate the next illustrated IR signal with the RF signal 876.

Figure 5G:
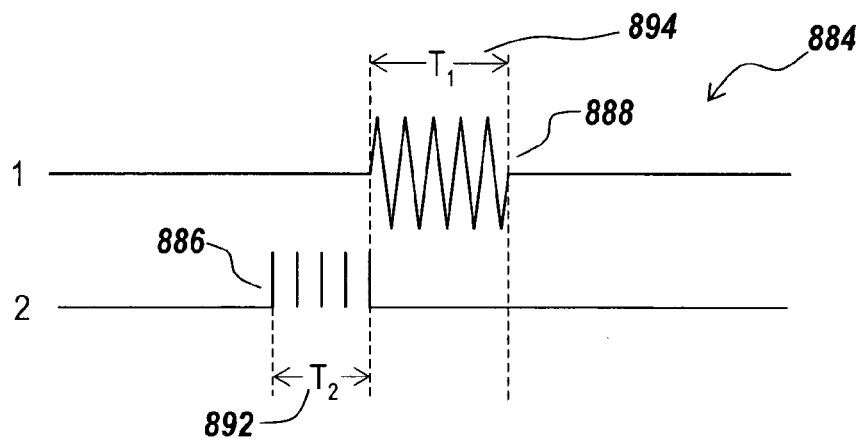
Figure 5H:
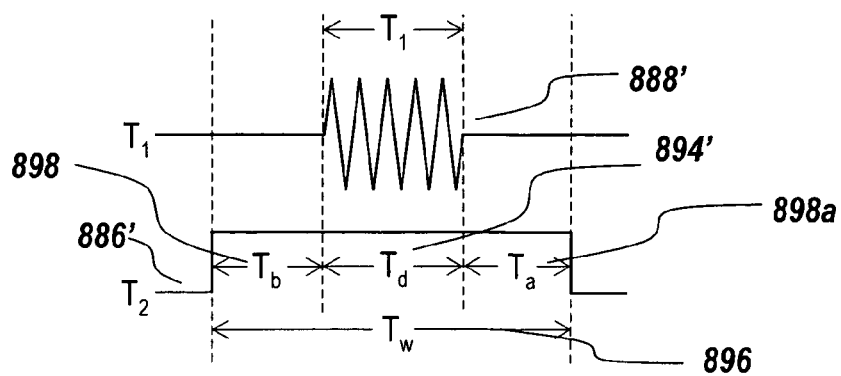

It is understood that the second signal does not have to follow the first signal to be associated with the first signal. The location determining module can be configured to look for a second signal, such as an IR signal, following, concurrent, or preceding the first signal, such as an RF signal. One example of such alternate signal sequencing is illustrated in FIG. 5G. In this scenario 884, the IR signal 886 precedes the RF signal 888. So long as the duration $(T_2)$ 892 of the IR signal 886 is smaller than the duration $(T_1)$ 894 of the RF signal 888, and employed consistently throughout the system, this configuration will function similar to the embodiment discussed above and disclosed in FIG. 5D-F, where the IR signal is associated with the RF signal. The IR signal could also be received concurrently with the RF signal so long as the IR signal is shorter in duration than the duration of the RF signal and the scheme is employed consistently throughout the system. FIG. 5H illustrates the theoretical time window $(T_w)$ 896 in which a second signal, such as an IR signal, 886' can be received in relation to a first signal, such as a RF signal, 888' such that an association can be made. The second signal 886 can be received within a time period before $(T_b)$ 898, during $(T_d)$ 894', or after $(T_a)$ 898a the receipt of the first signal 888'.

The IR signal used in conjunction with the RF signal can be as simple as a single pulse; however, to prevent other IR sources in the environment from interfering with the system, a more robust scheme is to use two or more pulses that are different in duration and timing from other IR devices such as remote controls.

A variation on this is to vary the spacing of the IR transmissions based on the unique data that is sent by the RF signal. This adds further robustness to the system by allowing each IR transmission to be uniquely identified.

The technique can also be implemented using different transmission techniques such as using IR for the first signal and RF for the second signal, replacing the IR with US, or replacing RF with US. It certain embodiments it is beneficial to maintain one signal as line of sight dependant, like IR, and one signal not line of sight dependant, like RF. There can also be more then two signals. For example, there could be RF, IR, and US signals transmitted. Other implementations and embodiments will be apparent to one skilled in the art given the benefit of this disclosure.

Figure 5I:
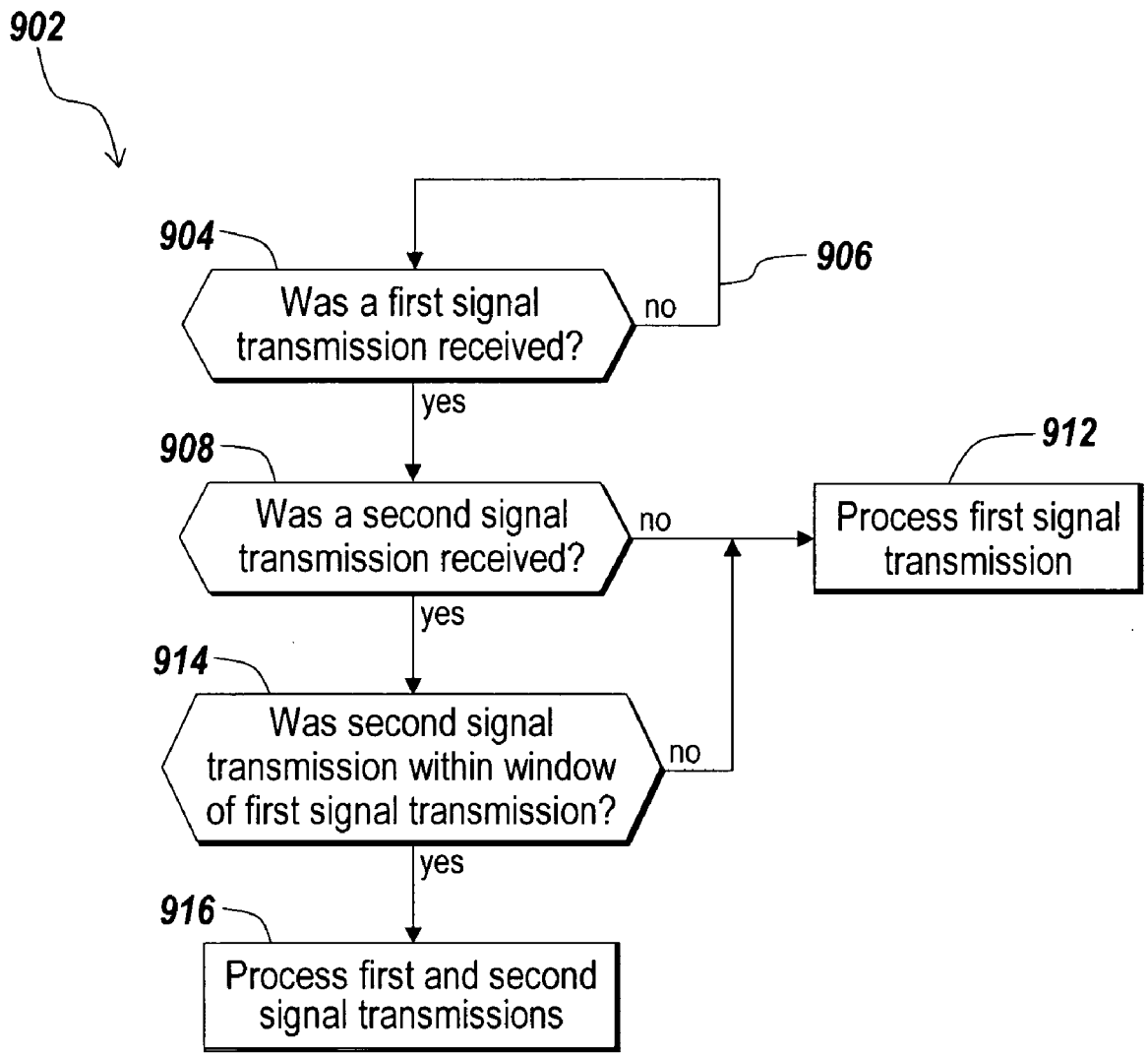

One embodiment of a method of operation 902 of this signal association is illustrated in FIG. 5I. First it is determined if a valid first signal, such as RF, is received, step 904. If a valid first signal is not received then the system waits for a valid first signal, step 906. If a valid first signal is received then the system determines if a second signal, such as IR, is received, step 908. If no valid second signal is received then only the first signal is processed by the system, step 912. If a valid second signal is received then it is determined if the second signal was within a selected time period, or window, of the first signal, step 914. The selected time period, or window, may be following or preceding the first signal depending on the configuration. In the previous examples, the second signal (IR) immediately follows the first signal (RF). If the second signal is not within the selected time period, or window, of the first signal then an association of the second signal with the first signal can not be determined, and the first signal transmission is processed without the second signal, step 912. If the second signal was within the window of the first signal then an association of the second signal with the first signal can be made and the first and second signal transmissions can be processed together, step 916, allowing the first signal to qualify, identify, authenticate, or gate, the second signal.

Although the disclosed embodiments deal primarily with the use of signal gating in location detection systems, and in particularly, in connection with indoor positioning systems, it is understood that such a system has uses in other application that would be apparent to one skilled in the art given the benefit of this disclosure.

Figure 6:
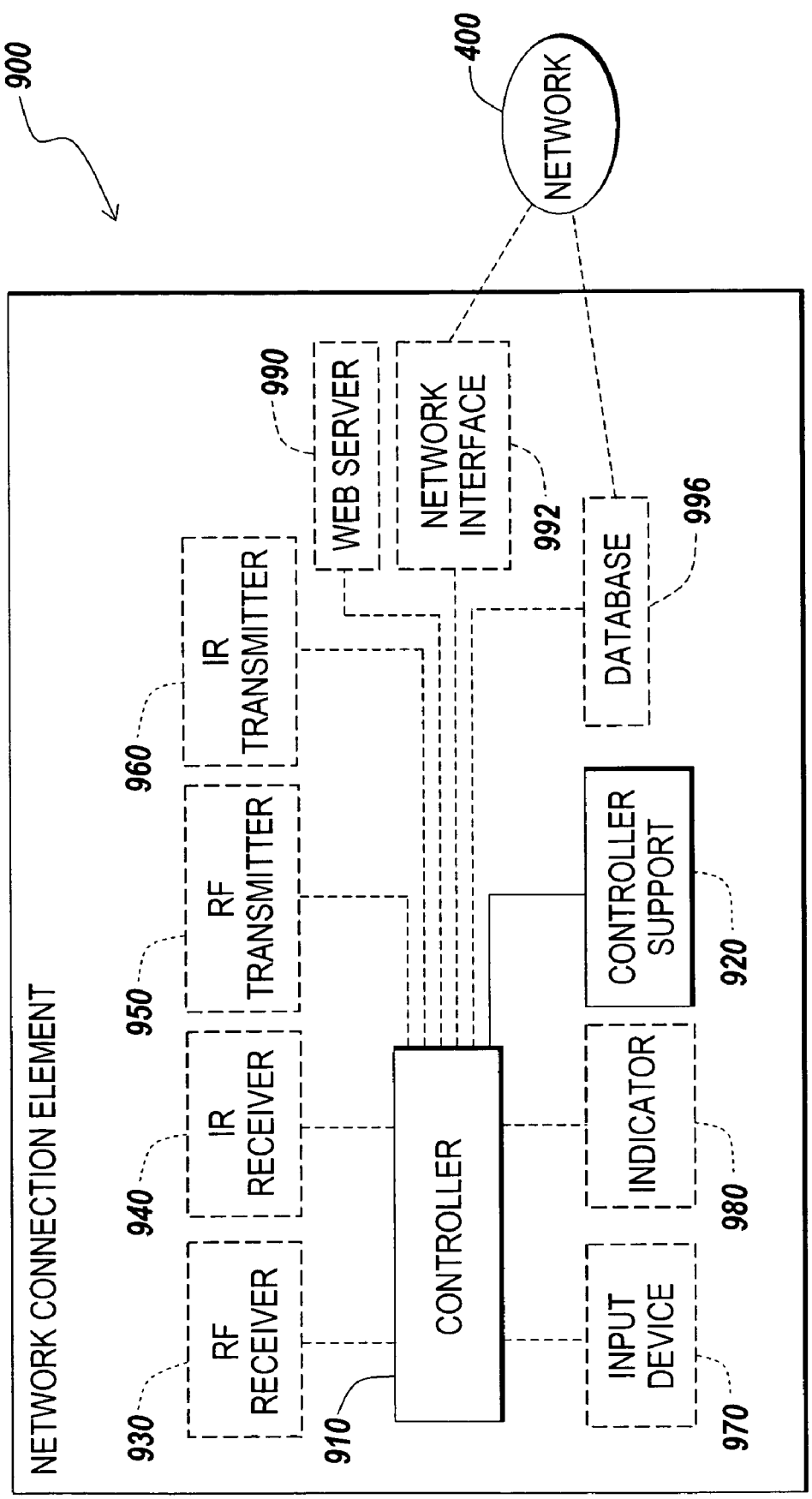
FIG. 6 illustrates a network connection element according to an embodiment of the invention.

An example of a network connection element 900 according to an embodiment of the invention is illustrated in FIG. 6. A network connection element 900 includes many component similar to those of the object identifier 800 illustrated by way of example in FIG. 3. A network connection element 900 is provided with a controller 910 and a controller support 920. Controller support 920 may optionally include non-volatile memory. Optionally, various embodiments of the invention may include one or more of the following in the network connection element 900: an RF receiver 930, an IR receiver 940, an RF transmitter 950, an IR transmitter 960, an input device 970 and/or an indicator 980.

The network connection element 900 is adapted to receive signals from the object identifier 800. According to an embodiment of the invention, the network connection element 900 contains hardware and software capable of receiving signals from other components of the location system, such as object identifiers 900, other network connection elements 900. According to an embodiment of the invention, the network connection element 900 may have network connectivity software, a local web server, object identifier analysis software, software to transmit the results of an object identifier analysis to a remote server, DHCP software and local permanent storage. According to an embodiment of the invention, the network connection element 900 may also include configuration, service and debug applets to be used in the maintenance and configuration of the object identifier 900.

The network connection element 900, according to an embodiment of the invention, may further be provided with a web server 990. As with the web server 340 of the receiver 300 of location system 100, web server 990 of network connection element 900 is able to provide or receive information or commands. In various embodiments of the invention, the web server 990 may allow for control and configuration of any component of the location system.

According to a further embodiment of the invention, the network connection element 900 may be provided with a network interface 992. The network interface 992, as with the network interface 330 of location system 100, is configured to couple the controller to a network 400. According to an embodiment of the invention, the network interface 992 is adapted to packetize buffered information received and send this information as a group, thereby providing more efficient network usage in some applications.

A further embodiment of the invention provides a database 996 in communication with then controller 910 of the network connection element 900. The database 996 may be provided within the network connection element 900 or may be provided on a network 400. According to alternative embodiment of the invention, the database 996 may be provided within the network connection element 900 and also in direct communication with the network 400.

Figure 7:
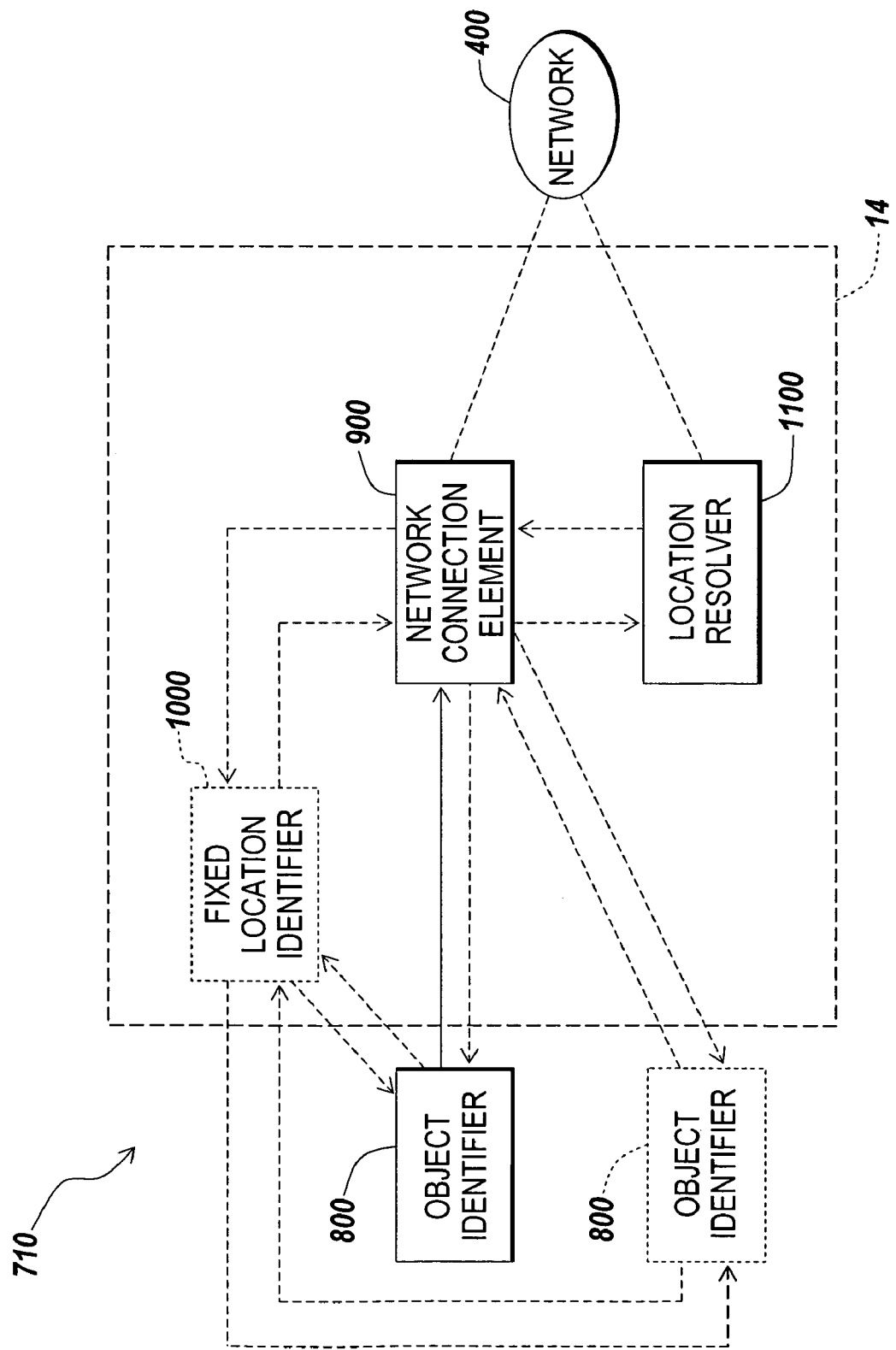
FIG. 7 illustrates a location system, according to a further embodiment of the invention, having a network connection element, one or more object identifiers, a location resolver, and an optional fixed location identifier.

According to a further embodiment of the invention, a location system 710 is illustrated by way of example in FIG. 7. According to this embodiment, a location resolver 1100 is provided for communication with the network connection element 900. In this embodiment, the location resolver 1100 communicates with one or more network connection elements 900 to obtain information pertaining to the location of one or more object identifiers 800 and one or more optional fixed location identifiers 1000. The location resolver 1100 may be provided in the form of software or hardware or a combination of both. The location resolver 1100 may communicate with one or more network connection elements 900 over a network 400.

As shown by way of example, a location determining module 14, according to an embodiment of the invention, is illustrated, by way of example, as including the network connection element 900, the location resolver 1100 and the fixed location identifier 1000. In this embodiment, the network 400 is not included in the location determining module 14, but optionally communicates with the location determining module 14.

Figure 8:
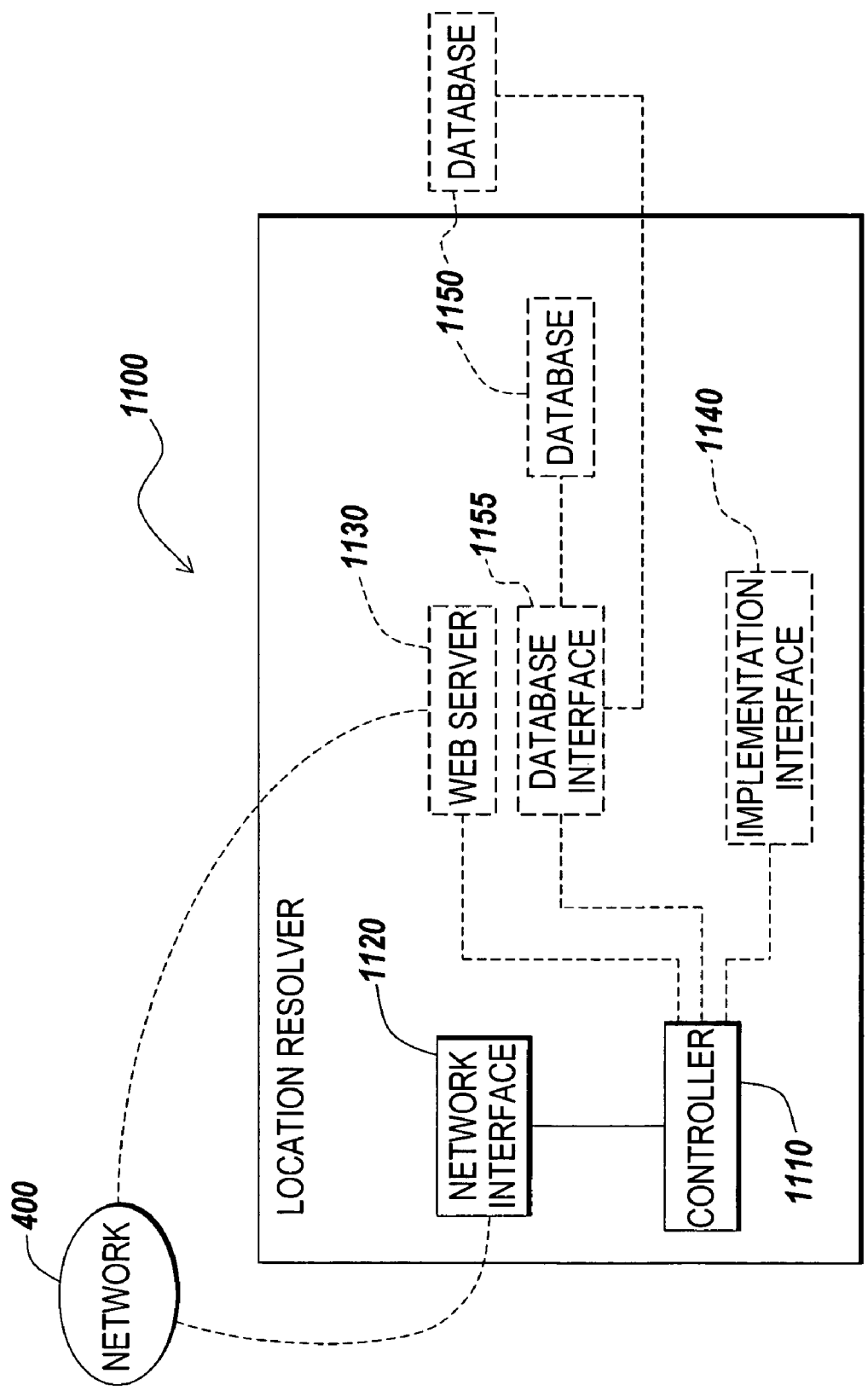
FIG. 8 illustrates a location resolver according to an embodiment of the invention.

The location resolver 1100, according to an embodiment of the invention, is further illustrated by way of example in FIG. 8. As shown in FIG. 8, a controller 1110 is provided in communication with a network interface 1120. The network interface 1120 is adapted to be coupled to the network 400. Controller support may also be optionally provided. A web server 1130 is provided in communication with a controller 1110. The web server 1130 of the location resolver 1100 is similar to the web server 990 of the network connection element 900, discussed herein.

According to an embodiment of the invention, the location resolver 1100 may be provided with a configuration capability to configure other components of the location system. For example, an embodiment of the location resolver 1100 may perform some or all of the following functions: reset system time; reset communications; disable all or selected input devices of all or selected components, such as object identifiers, fixed location identifiers, network connection elements; establish and/or cancel associations between all or selected components; establish and/or cancel privacy settings for specific location information; configure network communication protocols; configure receiver and/or transmitter configurations, altering or eliminating signals, signal types, such as RF, IR, ultrasonic, or the like, or transmission frequencies and the frequencies at which transmissions are expected.

An implementation interface 1140 is also provided in communication with controller 1110. The implementation interface 1140 is provided to communicate with other devices in order to allow for the communication of location information and/or initiation or response to commands as described herein. Various examples of implementation interfaces 1140 include XML and SMTP protocols, other examples may be apparent to those of ordinary skill in the art.

A database 1150 is also provided either within the location resolver 1100 or external the location resolver 1100. The database 1150 is adapted to store information relating to the location of one or more object identifiers 800 and/or optional fixed location identifiers 1000 and/or network connection elements 900. According to various embodiments of the invention, the database 1150 may store current and/or previous location and status information of location system components, associations of location system components with each other or locations, privacy protocols and status, topology data indicating locations of some or all location system components relative to each other, or in other descriptive terms, such as room or location names or by a coordinate system.

A database interface 1155 may be provided in another embodiment of the invention in order to facilitate interaction between the database 1150 and the controller 1110. The database interface 1155 may be a network or other hardware or software to controller 1110 to enable the controller 1110 to access the database 1150. Various examples of database interfaces 1155 include JDBC and ODBC, other examples may be apparent to those of ordinary skill in the art.

Figure 9:
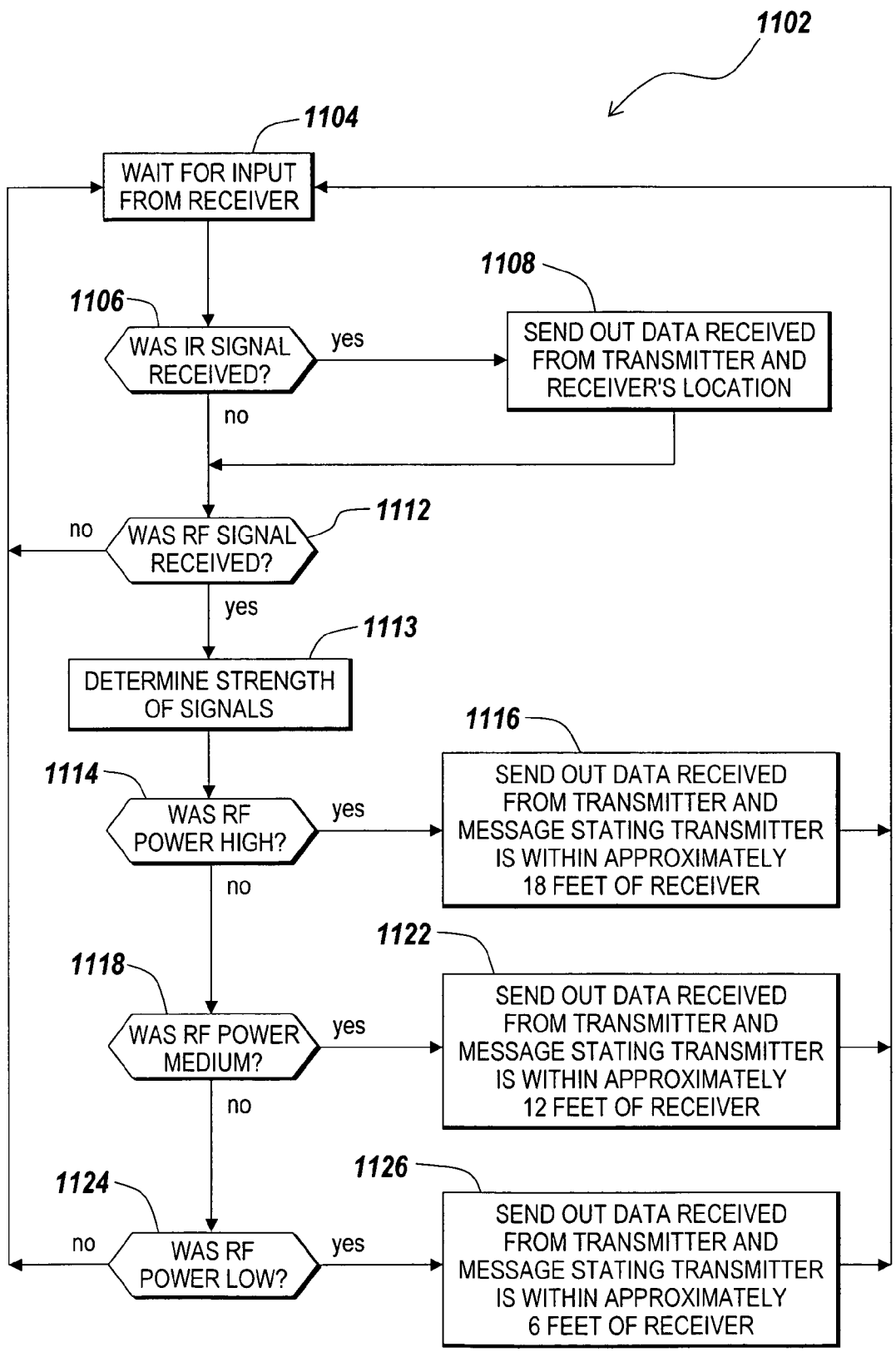
FIG. 9 provides a method of operation of a location resolver according to an embodiment of the invention.

One method 1102 of operation of the location resolver 1100, according to an embodiment of the invention is illustrated in FIG. 9. The location resolver 1100 initially waits for input from a receiver, such as the network connection element 900, step 1104. The location resolver 1100 then determines whether an IR signal was received, step 1106. If an IR signal was received, data received from the transmitter and receivers location is made available, step 1108. If an IR signal is not received the location resolver 1100 checks to see if an RF signal was received, step 1112. Location resolver 1100 also checks to see if an RF signal was received after making any data available from the reception of an IR signal available, step 1108. If an RF signal was not received, the location resolver 1100 according to an embodiment of the invention returns again to wait for further input from the network connection element 900. If an RF signal was received, the location resolver 1100 determines whether the RF power was high, step 1114. If so, data received from the transmitter is made available with message indicating that the object identifier is within a large radius of the network connection element 900, step 1116. If the RF signal power was not high the location resolver 1100 determines whether the RF power was medium, step 118. If so, data received from the object identifier is made available with a message that the object identifier is within a smaller radius of the network connection element 900, step 1122. If the RF signal power was not medium the location resolver 1100 determines whether the RF signal power was low, step 1124. If so data from the object identifier 800 is made available with an indication that the object identifier is within a smaller radius of the network connection element 900, step 1126. The location resolver 1100 then returns to await further input from one or more of the network connection elements 900, step 1104.

It is understood that the method of FIG. 9 may be accomplished by using transmitters that vary in output power or by constant power output transmitters. In using constant power output transmitters, received signal strength is categorized according to signal strength, such as by the use of a histogram. According to an embodiment of the invention, the network connection element 900 classifies signal strength within specific ranges and may pass an indication of the appropriate range to other location system components. According to another embodiment of the invention, the network connection element 900 provides a signal strength value that may be passed to other location system components, such the location resolver 1100, allowing more precise analysis of received signal strength information.

According to one embodiment of the invention, RF and IR signal strength are adjusted to a range of approximately 20 feet. Other embodiments of the invention may involve adjusting signal strength of RF and/or IR and/or other signal types, such as ultrasonic, ranges to a few inches, feet, thousands of feet, or miles. Another embodiment of the invention involves varying signal strength among various types of object identifiers.

A method of operation of the location resolver 1100 involves multilateration. Multilateration determines location by the use of determining range from a relative location. Multilateration can be performed by a single receiver, but is best accomplished by multiple receivers. An object can infer the location of another object by calculating its range from one or more beacons with known locations using some type of signal measurement. According to an embodiment of the invention RF signal strength is used to determine location. According to a further embodiment both RF and IR are used to determine location. It is understood that an absence of a signal that is expected is considered a signal for purposes of determining location. An example, for purposes of illustration, is the receipt of an RF signal but not an IR signal may indicate a transmitter out of IR range but within RF range, or just out of line-of-sight if required for lower-powered IR transmissions. The receiver may be configured to expect both RF and IR transmissions at specific intervals generally or for a specific transmitter. This is one example of the use of both RF and IR for determination of location.

In addition to current signal information, other information may be used in determining location. Previous location information may also be used in determining current location. Locations of other location system components may also be used in determining location. For example, locations of one or more network connection elements 900, one or more fixed location identifiers 1000 and other object identifiers 800 may be used in determining location of a particular location system component. According to one embodiment, establishing relative distances between additional nearby components and the component for which location information is desired assist in establishing a location with greater particularity.

According to an embodiment of the invention, transmission rates may vary among different types of object identifiers. Transmission rates may be adjusted in relation to the type of object for which location information is desired. Examples include low transmission rates for objects typically stationary, such as equipment typically found in a particular room. Whereas people, or mobile equipment may be better tracked by more frequent signal transmissions.

Another method of determining location involves at least one Bayesian network. A further method of determining location involves triangulation. An example of one or more of the foregoing methodologies are described, for example, in U.S. Pat. No. 5,774,876, which is incorporated herein by reference. Bayesian networks are also described in Castro, Paul et al. "A Probabilistic Room Location Service for Wireless Networked Environments" In: *Ubicomp* 2001: *Ubiquitous Computing, Third International Conference, Atlanta, Ga., USA, September* 30-*Oct.* 2, 2001 *Proceedings.* Edited by G. D. Abowd, et al. Heidelberg, Germany: Springer-Verlag, 2001, LNCS 2201, p. 18 ff. This publication is incorporated herein by reference. Combinations of these methods or other methods of location determination may be apparent to one of ordinary skill in the art and are included within the scope of the invention.

Privacy conditions may be established regarding location information for one or more location system components. Privacy may be accomplished in a variety of ways. For example, privacy may be accomplished by not making location information available or by not determining location information. Privacy may be managed by an opt-out protocol, requiring an action to establish privacy. Privacy may be managed by an opt-in protocol, requiring an action to cancel privacy. A not-opt-out protocol may also be used, preventing action from establishing privacy. Various protocols may be used in combination within a location system. Different location system components may subject to different protocols. Examples include various groups of object identifiers being subject to different protocols, such as some people able to select a privacy protocol or a privacy status, such as privacy or no privacy, while object identifiers used to locate equipment may be subject to a not-opt-out protocol. According to an embodiment of the invention, protocols or privacy status may be assigned through a batch-processing capability in a user interface. According to another embodiment, privacy status for opt-in or opt-out protocols may be accomplished by an input device incorporated in the location system component. Optionally, privacy status may be confirmed by an indicator incorporated in the location system component.

Associations associating objects with other objects or with locations may be established. Examples of the use of associations include: determining procedure times, room utilization, proximity alerts that may be used to alert a fall of a person, regulatory compliance, person & equipment associations; location & equipment associations; friend & foe associations, and automatic billing. According to an embodiment of the invention, association information may be stored in a database. Associations may be performed through a batch-processing capability in a user interface. According to another embodiment, associations may be accomplished by an input device incorporated in the location system component. Optionally, association status may be confirmed by an indicator incorporated in the location system component. One example involves activating an input device on an object identifier, fixed location identifier or network connection element. An indicator indicates, such as by an LED or sound, that association can be performed. An input device may then be activated within a limited time on another location system component, such as an object identifier, to establish an association between the components.

Events or actions may be initiated based on location information association information or input device status, or changes in any of these. One example involves sending information in response to an object identifier being within a range of locations or a specific location. An example includes paging a doctor when a specific patient enters a treatment area. Other examples of actions include entering information in a database, sending XML data containing the current location data and status of a location system component onto the network. An example is the use of a cardiac monitoring application typically used in a health care institution for receiving a report of a cardiac arrest. The term health care institution, as used herein, includes a wide variety of facilities associated with providing health care or services. Examples include hospitals, managed care facilities, assisted care facilities and clinics. The location system according to an embodiment of the invention may be configured to receive a request for the location of a particular patient, or the cardiac monitoring equipment sounding the alarm. The location system can then automatically reply with location information to assist health care institution staff in locating the patient in need. A similar example could use the activation of an input device on an object identifier as a distress call by a patient, with the alert and location information forwarded to a health care institution communication system for prompt attention by health care institution staff. One embodiment of the invention may interface with a Winegard interface to unlock a door, or activate other security equipment, in response to location information or input device status. Other examples include pages, WAP messages, sending e-mails and activating or canceling alarms.

According to an embodiment of the invention, the components of the location system do not retransmit signals if they are not received. By waiting until the next scheduled transmission, transmissions throughout the location system area are reduced and interference difficulties are reduced.

Figure 10:
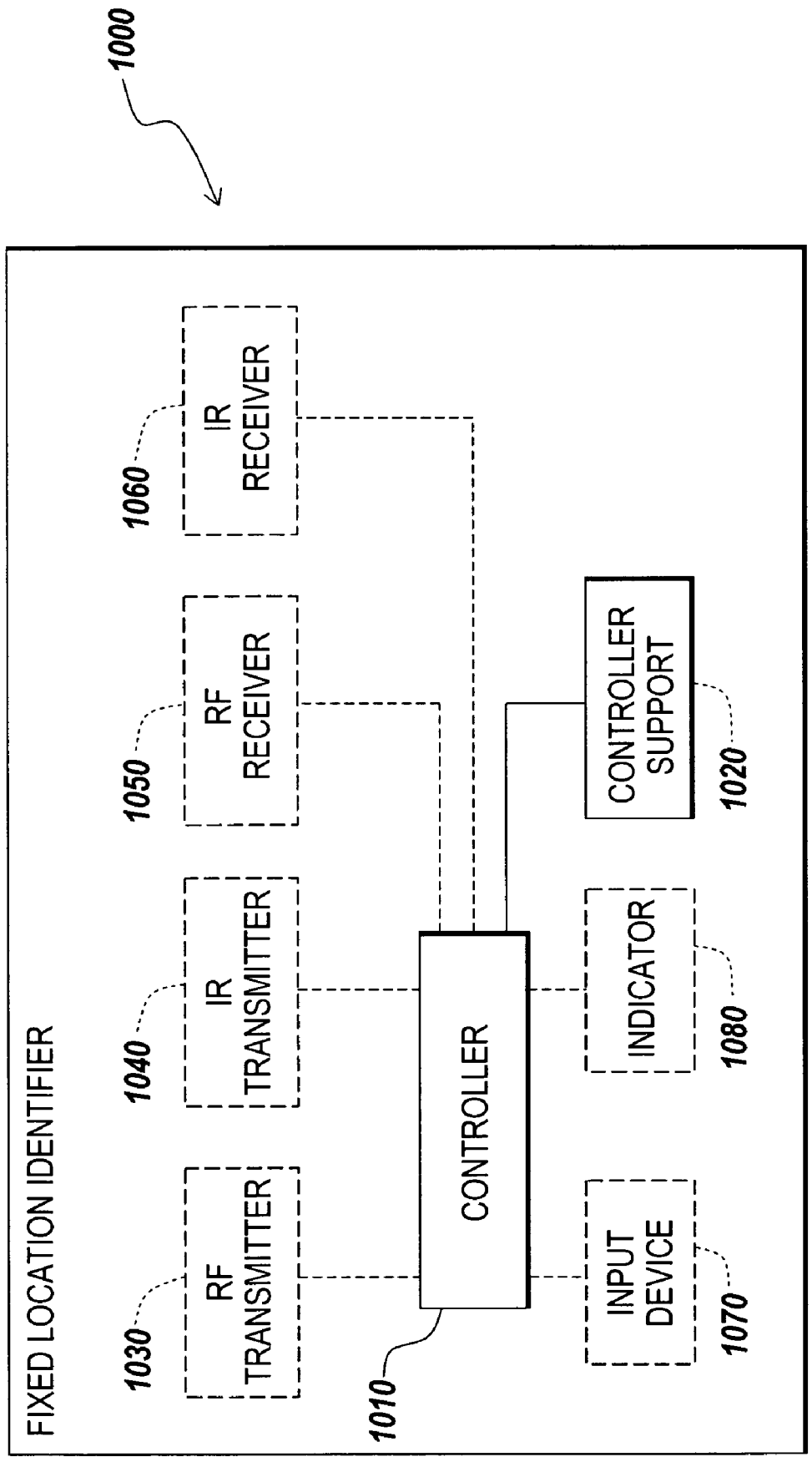
FIG. 10 illustrates a fixed location identifier according to an embodiment of the invention.

The fixed location identifier 1000, according to an embodiment of the invention is illustrated by way of example in FIG. 10. The fixed location identifier 1000 is similar to the object identifier 800 illustrated and described in relation to FIG. 3. A controller 1010 is provided in communication with controller support 1020. RF and IR transmitters and receivers 1030, 1040, 1050, 1060 may be provided individually or in combination according to various embodiments of the invention. An input device 1070 and indicator 1080 may also each or both be included in various embodiments of the invention. The fixed location identifier 1000 is configured to receive signals from one or more object identifiers 800, and/or other fixed location identifiers 1000, and retransmit these signals to a network connection element 900 along with identifying information to designate which of the fixed location identifiers 1000 is retransmitting the information. Additional information relating to the retransmitting fixed location identifier 1000 may also be appended, such as battery information or other status information allowing remote monitoring of the fixed location identifier 1000.

According to various embodiments of the invention, the fixed location identifier 1000 may be provided with input devices 1070 or indicators 1080 to enable input information or various signaling functionality. Fixed location identifiers 1000 do not need to be coupled to other components by the use of wiring or other infrastructure. Therefore, the use of fixed location identifiers 1000 enable a location system to be implemented with fewer network connection elements, as fixed location identifiers can provide additional information as to the location of object identifiers 800. Furthermore, fixed location identifiers 1000, can extend the range of network connection elements 900 by providing an optional higher power transmission signal to reach network connection elements 900 at ranges that object identifiers 800 may be incapable of reaching.

The network connection element 900 is adapted to receive signals from the fixed location identifier 1000 as described above in relation to signals from the object identifier 800. According to an embodiment of the invention, the network connection element 900 contains hardware and software capable of receiving signals from the fixed location identifier 1000. According to an embodiment of the invention, the network connection element 900 may have network connectivity software, a local web server, fixed location identifier software, software to transmit the results of a fixed location identifier analysis to a remote server, DHCP software and local permanent storage. According to an embodiment of the invention, the network connection element 900 may also include configuration, service and debug applets to be used in the maintenance and configuration of the fixed location identifier 1000.

Figure 11:
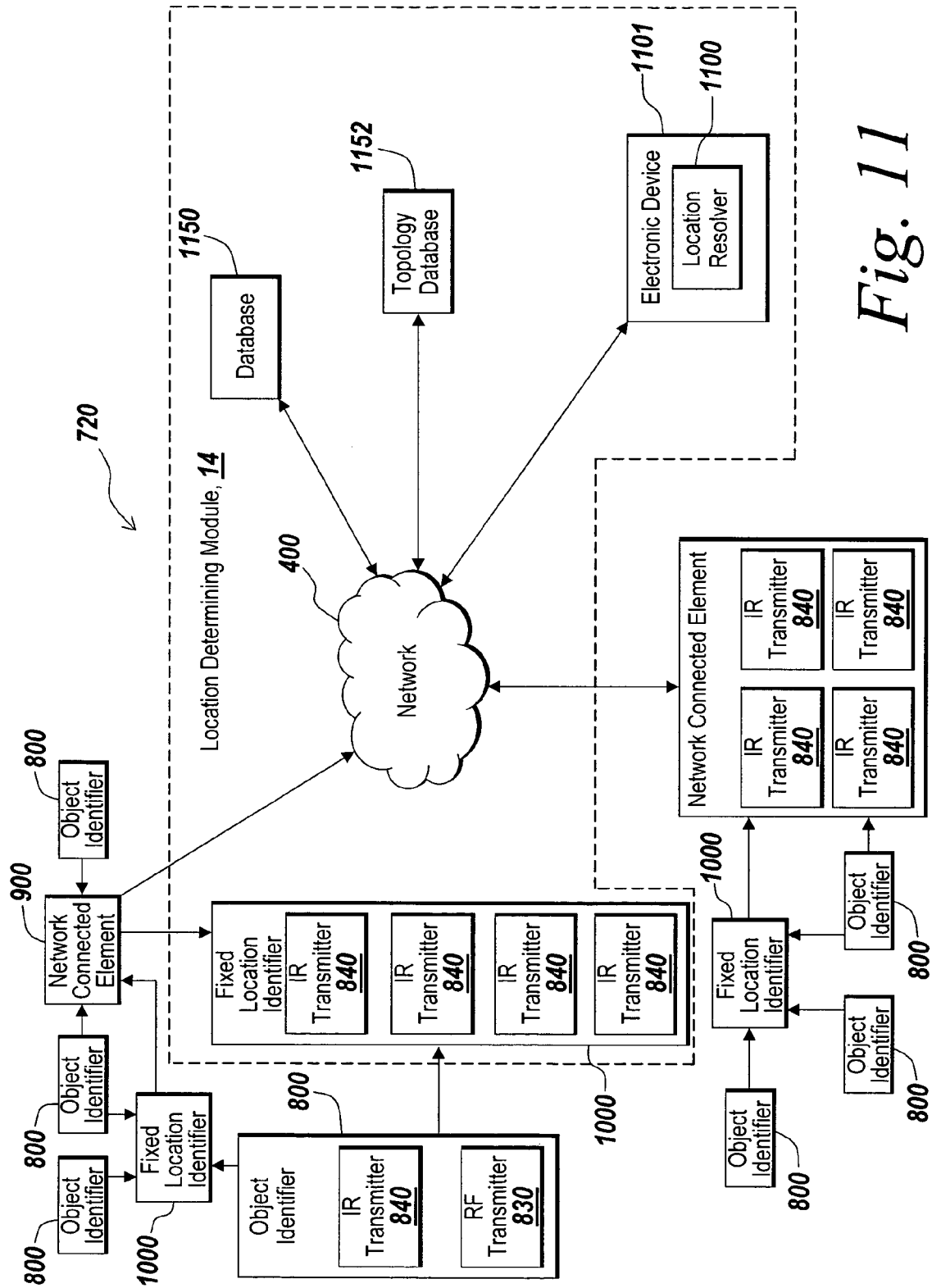
FIG. 11 illustrates a location system according to a further embodiment of the invention.

A location system 720, according to a further embodiment of the invention, is illustrated by way of example in FIG. 11.

The location system 720 includes various object identifiers 800, network connection elements 900 and fixed location identifiers 1000. A network 400 is illustrated along with a database 1150 and location resolver 1100. According to the present embodiment, a topology database 1152 is separately provided from the database 1150. The topology database 1152 may be provided with information pertaining to the locations of network connection elements 900 and fixed location elements 900 and fixed location identifiers 1000. Such topology information allows for more descriptive data to be provided regarding the location of object identifiers 800. For example, the location of a fixed location identifier 1000 or network connection element 900 may be specified as a particular office, hallway or area. Therefore, if an object identifier 800 is identified as within a small radius of a fixed location identifier 1000 or network connection element 900, the object identifier 800 may be identified as being within specific room, office or area.

An electronic device 1101 is provided to host the location resolver 1100. According to this embodiment the location resolver 1100 is in the form of software operating on the electronic device 1101. Examples of electronic devices 1101 include computers, processors or other devices capable of implementing the functionality of the location resolver 1100.

As shown by way of example, a location determining module 14, according to an embodiment of the invention, is illustrated, by way of example, as including one of the fixed location identifiers 1000, the network 400, the electronic device 1101, the location resolver 1100, the database 1150 and topology database 1152.

Figure 12:
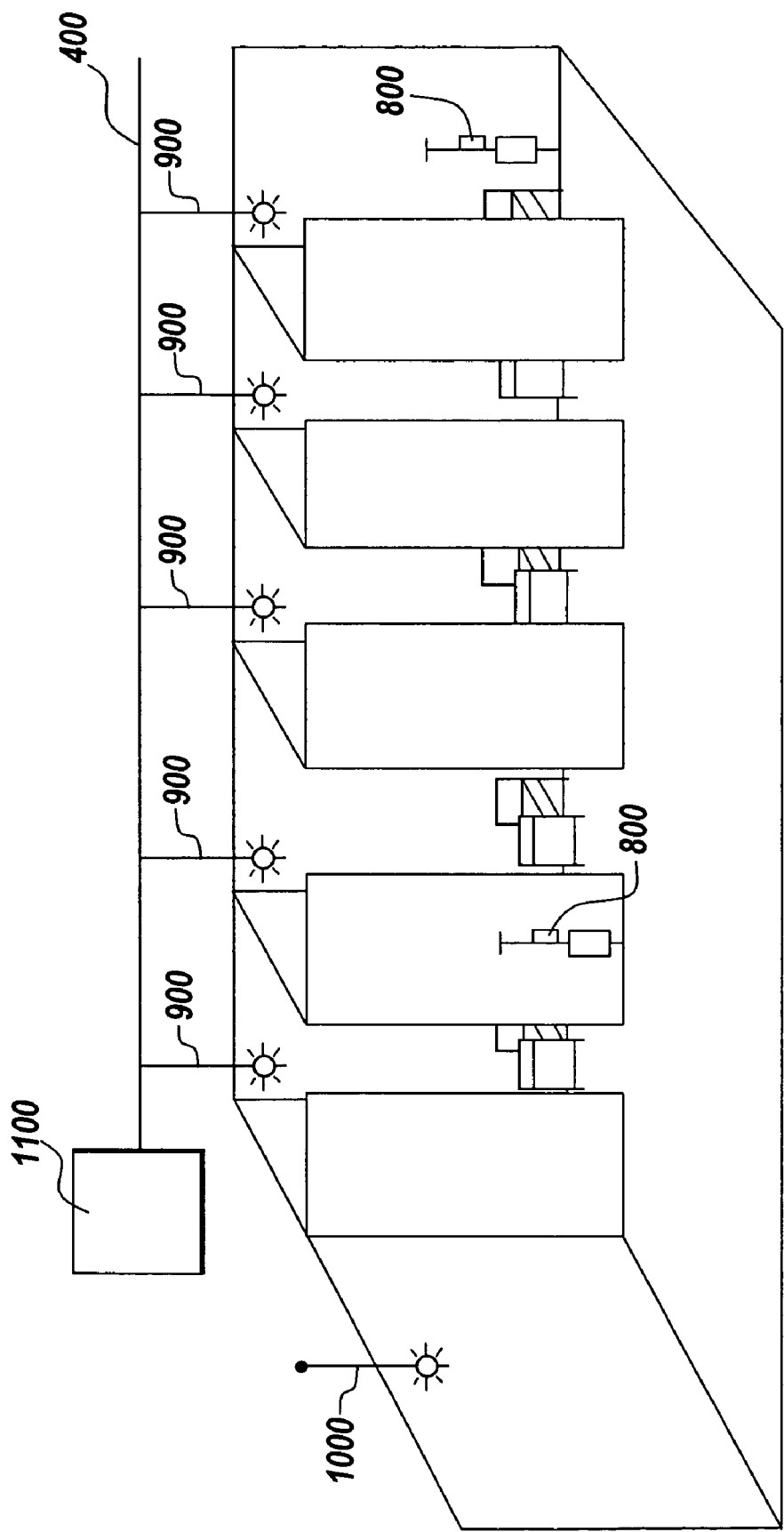
FIG. 12 provides a perspective view of a location system installed at a location according to a further embodiment of the invention.

An example of a location system in use in a health care institution setting is illustrated in FIG. 12. As shown by way of example in FIG. 12, a network 400 is provided to allow for communication among multiple network connection elements 900. A location resolver 1100 is also provided in communication is also provided in communication with the network 400. It is noted that the network is not limited to a wired network, as the network may be a wireless network. A fixed location identifier 1000 is illustrated and is in communication with the network connection elements 900. Various object identifiers 800 are illustrated as a fixed to various pieces of equipment within the health care institution setting. The object identifiers 800 may be in communication with one or more of each of the network connection elements 900 and the fixed location identifier 1000.

Figure 13:
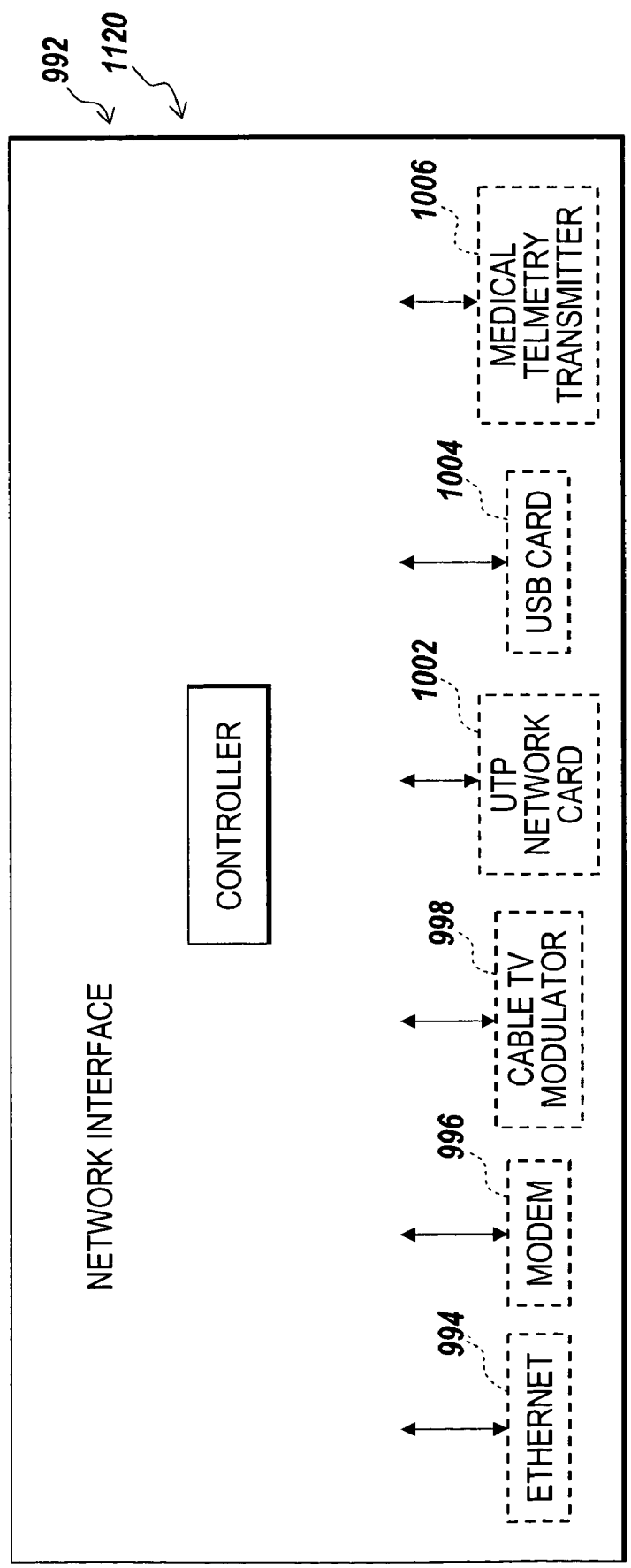
FIG. 13 illustrates a network interface for use in a network connection element or a location resolver according to an embodiment of the invention

As illustrated in FIG. 13, a network interface 992, 1120 is shown by way of example according to an embodiment of the invention. The network interface 992, 1120 may be used in one or more of the network connection elements 900 and/or location resolver 1100 or other components adapted for communication with a network. A network interface 992, 1120 is adapted to be directly coupled to a network. The network interface 992, 1120 may be configured with one or more of the appropriate configurations for the corresponding networks. For example, it is illustrated by way of example in FIG. 13, the network interface 992, 1120 may be configured to be directly to an Ethernet network by way of Ethernet circuitry 994. According to a further embodiment, the network interface 992, 1120 may be coupled to a telephone system to a modem 996. According to another embodiment of the invention, the network interface 992, 1120 may be provided with one or more of a cable television modulator 998 to allow communication with a cable T.V. network, a UTP network card 1102, to allow communication with a UTP network, or a universal serial bus (USB) card 1104 and/or a medical telemetry transmitter 1106 for communication with a medical telemetry network.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A location system comprising a location determining module adapted to receive a first signal comprising unique data and a second signal comprising non-unique data, the location determining module being adapted to associate one of the signals with the other signal provided the first and second signals are received within a selected time period of each other.

2. The location system of claim 1, wherein the first and second signals are electromagnetic signals.

3. The location system of claim 1, wherein the first signal is an RF signal and the second signal is an IR signal.

4. The location system of claim 1, wherein the first signal is a non line-of-sight signal and the second signal is a line-of-sight signal.

5. The location system of claim 1, wherein the first signal is selected from the group consisting of an RF, IR, and US signal and the second signal is selected from the group consisting of an RF, IR, and US signal.

6. The location system of claim 5, wherein the first signal does not match the second signal.

7. The location system of claim 1, wherein the first signal and the second signal are used to determine a location of an object.

8. The location system of claim 1, wherein information about the second signal is derived from the first signal.

9. The location system of claim 1, wherein the location system is an indoor positioning system.

10. The location system of claim 1, wherein the location determining module comprises a receiver for receiving the first and second signals.

11. The location system of claim 1, wherein the location determining module comprises a network.

12. The location system of claim 1, wherein the location determining module comprises a network connection element.

13. The location system of claim 1, wherein the location determining module comprises a database.

14. The location system of claim 1, wherein the location determining module comprises a fixed location identifier.

15. The location system of claim 1, wherein the location determining module comprises a location resolver for determining a location of an object from the first and second signals.

16. The location system of claim 1, wherein the location determining module comprises a fixed location identifier, a network connection element, and a location resolver adapted for communication with each other by way of a network; wherein the location resolver is adapted to determine the location of an object from the first and second signals.

17. The location system of claim 1, wherein the first and second signals are associated if the second signal is received following the receipt of the first signal.

18. The location system of claim 1, wherein the first and second signals are associated if the second signal is received preceding the receipt of the first signal.

19. A location system, comprising:
one or more object identifiers adapted to transmit a first signal comprising unique data and a second signal comprising non-unique data; and
a location determining module adapted to receive the first signal and the second signal for determining a location of the one or more object identifiers from the first signal and the second signal, wherein the location detection module is adapted to associate the first signal with the second signal provided the signals are received within a selected time period of each other.

20. The location system of claim 19, wherein the first and second signals are electromagnetic signals.

21. The location system of claim 19, wherein the first signal is an RF signal and the second signal is an IR signal.

22. The location system of claim 19, wherein the first signal is selected from the group consisting of an RF, IR, and US signal and the second signal is selected from the group consisting of an RF, IR, and US signal.

23. The location system of claim 22, wherein the first signal does not match the second signal.

24. The location system of claim 19, wherein the first signal and the second signal are used to determine a location of an object.

25. The location system of claim 19, wherein information about the second signal is derived from the first signal.

26. The location system of claim 19, wherein the location system is an indoor positioning system.

27. The location system of claim 19, wherein the location determining module comprises a receiver for receiving the first and second signals.

28. The location system of claim 19, wherein the location determining module comprises a network.

29. The location system of claim 19, wherein the location determining module comprises a network connection element.

30. The location system of claim 19, wherein the location determining module comprises a database.

31. The location system of claim 19, wherein the location determining module comprises a fixed location identifier.

32. The location system of claim 19, wherein the location determining module comprises a location resolver for determining a location of an object from the first and second signals.

33. The location system of claim 19, wherein the location determining module comprises a fixed location identifier, a network connection element, and a location resolver adapted for communication with each other by way of a network; wherein the location resolver is adapted to determine the location of an object from the first and second signals.

34. The location system of claim 19, wherein the first and second signals are associated if the second signal is received following the receipt of the first signal.

35. The location system of claim 19, wherein the first and second signals are associated if the second signal is received preceding the receipt of the first signal.

36. A method of signal association, comprising the steps of:
receiving a first signal comprising unique data and a second signal comprising non-unique data at a location determining module; and
determining if there is an association between the first signal and the second signal based on whether the first signal and the second signal were received within a selected time period of each other.

37. The method of claim 36, wherein the first signal and the second signal are transmitted from an object identifier.

38. A location system, comprising:
an object identifier adapted to transmit a RF signal comprising unique data and a IR signal comprising non-unique data; and
a location determining module adapted to receive the RF signal and the IR signal for determining a location of the object identifier from the RF signal and the IR signal, wherein the location detection module is adapted to associate the RF signal with the IR signal provided the signals are received within a selected time period of each other.

39. A method of signal association, comprising the steps of:
transmitting a RF signal comprising unique data and a IR signal comprising non-unique data from an object identifier;
receiving the RF signal and the IR signal at a location determining module; and
determining if there is an association between the RF signal and the IR signal based on whether the RF signal and the IR signal were received within a selected time period of each other.

40. A method of determining location, comprising the steps of:
transmitting a first signal comprising unique data and a second signal comprising non-unique data from an object identifier;
receiving the first signal and the second signal at a location determining module;
determining if there is an association between the first signal and the second signal based on whether the first signal and the second signal were received within a selected time period of each other; and
determining a location of the object identifier based on receipt of the first signal and the second signal.

41. A method of determining location, comprising the steps of:
transmitting a RF signal comprising unique data and a IR signal comprising non-unique data from an object identifier;
receiving the RF signal and the IR signal at a location determining module;
determining if there is an association between the RF signal and the IR signal based on whether the RF signal and the IR signal were received within a selected time period of each other; and
determining a location of the object identifier based on receipt of the RF signal and the IR signal.

* * * * *